(12) United States Patent
Rothrock et al.

(10) Patent No.: US 11,995,903 B2
(45) Date of Patent: *May 28, 2024

(54) SYSTEMS AND METHODS FOR PROCESSING ELECTRONIC IMAGES FOR COMPUTATIONAL DETECTION METHODS

(71) Applicant: PAIGE.AI, Inc., New York, NY (US)

(72) Inventors: Brandon Rothrock, Los Angeles, CA (US); Christopher Kanan, Pittsford, NY (US); Julian Viret, New York, NY (US); Thomas Fuchs, New York, NY (US); Leo Grady, Darien, CT (US)

(73) Assignee: Paige.AI, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,252

(22) Filed: Mar. 20, 2023

(65) Prior Publication Data

US 2023/0245477 A1  Aug. 3, 2023

Related U.S. Application Data

(63) Continuation of application No. 17/811,960, filed on Jul. 12, 2022, now Pat. No. 11,640,719, which is a (Continued)

(51) Int. Cl.
*G06V 20/69* (2022.01)
*G06F 18/214* (2023.01)
(Continued)

(52) U.S. Cl.
CPC ........ *G06V 20/695* (2022.01); *G06F 18/2155* (2023.01); *G06N 20/00* (2019.01);
(Continued)

(58) Field of Classification Search
None
See application file for complete search history.

(56) References Cited

U.S. PATENT DOCUMENTS 10,650,929 B1 *  5/2020  Beck ............... G16H 50/70
11,176,676 B2   11/2021  Rothrock et al.
(Continued)

FOREIGN PATENT DOCUMENTS

JP   2009508200 A   2/2009
WO  2019026081 A2   2/2019
(Continued)

OTHER PUBLICATIONS

Detection of epithelial growth factor receptor ( EGFR) mutations on CT images of patients with lung adenocarcinoma using radiomics and/or multi-level residual convolutionary neural networks; Xiao-Yang Li 1 , Jun-Feng Xiong 2 , Tian-Ying Jia 1 , Tian-Le Shen 1 , Run-Ping Hou 1 , Jun Zhao 2 , Dec. 10, 2018 (Year: 2018).
(Continued)

*Primary Examiner* — Nancy Bitar
(74) *Attorney, Agent, or Firm* — Bookoff McAndrews, PLLC

(57) ABSTRACT

Systems and methods are disclosed for receiving one or more electronic slide images associated with a tissue specimen, the tissue specimen being associated with a patient and/or medical case, partitioning a first slide image of the one or more electronic slide images into a plurality of tiles, detecting a plurality of tissue regions of the first slide image and/or plurality of tiles to generate a tissue mask, determining whether any of the plurality of tiles corresponds to non-tissue, removing any of the plurality of tiles that are determined to be non-tissue, determining a prediction, using a machine learning prediction model, for at least one label for the one or more electronic slide images, the machine learning prediction model having been generated by processing a plurality of training images, and outputting the prediction of the trained machine learning prediction model.

20 Claims, 15 Drawing Sheets

Related U.S. Application Data continuation of application No. 17/480,826, filed on Sep. 21, 2021, now Pat. No. 11,423,547, which is a continuation of application No. 17/159,849, filed on Jan. 27, 2021, now Pat. No. 11,176,676.

(60) Provisional application No. 62/966,716, filed on Jan. 28, 2020.

(51) Int. Cl.
| | |
|---|---|
| *G06N 20/00* | (2019.01) |
| *G06T 7/00* | (2017.01) |
| *G06T 7/136* | (2017.01) |
| *G06T 7/194* | (2017.01) |
| *G06V 10/26* | (2022.01) |
| *G06V 10/28* | (2022.01) |

(52) U.S. Cl.
CPC ............ *G06T 7/0012* (2013.01); *G06T 7/136* (2017.01); *G06T 7/194* (2017.01); *G06V 10/26* (2022.01); *G06V 10/28* (2022.01); *G06V 20/698* (2022.01); *G06T 2207/20081* (2013.01); *G06T 2207/30024* (2013.01)

(56) References Cited

U.S. PATENT DOCUMENTS

| | | | | |
|---|---|---|---|---|
| 2004/0241730 | A1* | 12/2004 | Yakhini | G16B 20/00 435/6.14 |
| 2009/0076368 | A1* | 3/2009 | Balas | A61B 1/00149 600/407 |
| 2012/0069049 | A1* | 3/2012 | Howe | G06K 9/00134 345/629 |
| 2012/0127297 | A1* | 5/2012 | Baxi | G06K 9/036 348/79 |
| 2016/0014343 | A1* | 1/2016 | Kawano | G06F 3/041 345/173 |
| 2016/0063724 | A1 | 3/2016 | Tunstall et al. | |
| 2016/0232425 | A1* | 8/2016 | Huang | G06T 7/0012 |
| 2016/0381256 | A1* | 12/2016 | Aguirre-Valencia | H04N 13/30 348/46 |
| 2017/0270666 | A1* | 9/2017 | Barnes | G06T 7/12 |
| 2017/0330327 | A1* | 11/2017 | Ippolito | G06T 7/11 |
| 2019/0304092 | A1 | 10/2019 | Akselrod-Ballin et al. | |
| 2020/0097727 | A1* | 3/2020 | Stumpe | G06T 11/60 |
| 2020/0258223 | A1* | 8/2020 | Yip | G06T 7/0012 |
| 2021/0192729 | A1 | 6/2021 | Raciti et al. | |
| 2021/0192730 | A1 | 6/2021 | Raciti et al. | |

FOREIGN PATENT DOCUMENTS

| | | |
|---|---|---|
| WO | 2019108695 A1 | 6/2019 |
| WO | 2020198380 A1 | 10/2020 |
| WO | 2020261183 A1 | 12/2020 |

OTHER PUBLICATIONS

International Search Report and Written Opinion issued in International Patent Application No. PCT/US2021/015285 dated May 4, 2021 (17 pages, in English).

Zeng, Dongdong, et al. "Background subtraction using multiscale fully convolutional network." IEEE Access 6 (2018) 3 16010-16021.

* cited by examiner

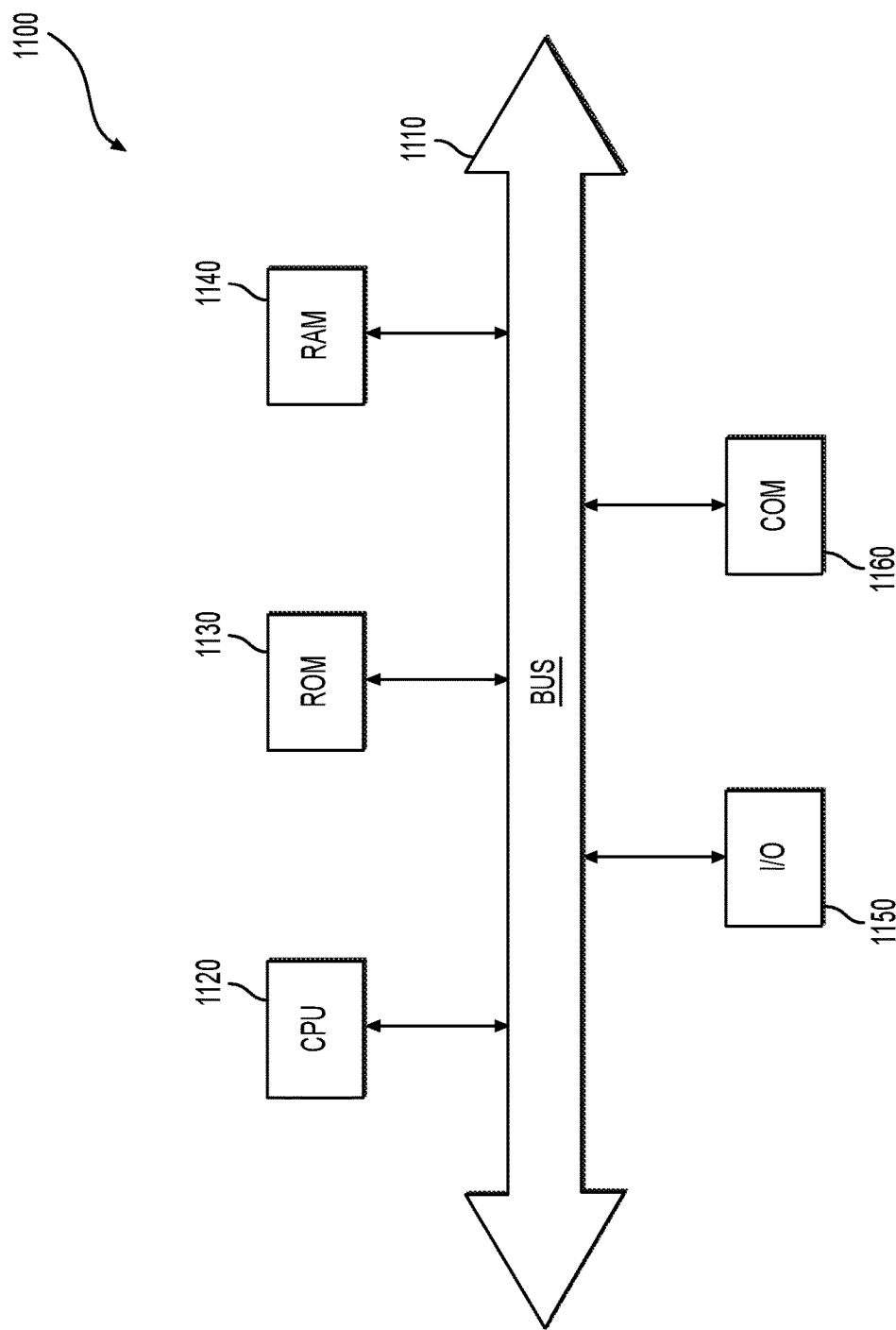

SYSTEMS AND METHODS FOR PROCESSING ELECTRONIC IMAGES FOR COMPUTATIONAL DETECTION METHODS

CROSS-REFERENCE TO RELATED APPLICATION(S)

This application is a continuation of U.S. application Ser. No. 17/811,960, filed on Jul. 12, 2022, which is a continuation of U.S. application Ser. No. 17/480,826, filed on Sep. 21, 2021, which is a continuation of U.S. application Ser. No. 17/159,849, filed on Jan. 27, 2021, which claims priority to U.S. Provisional Application No. 62/966,716 filed Jan. 28, 2020, the entire disclosures of which are hereby incorporated herein by reference in their entireties.

FIELD OF THE DISCLOSURE

Various embodiments of the present disclosure pertain generally to creating a prediction model to predict labels for prepared tissue specimens by processing electronic images. More specifically, particular embodiments of the present disclosure relate to systems and methods for predicting, identifying or detecting diagnosis information about prepared tissue specimens. The present disclosure further provides systems and methods for creating a prediction model that predicts labels from unseen slides.

BACKGROUND

The performance of machine learning and deep learning models for histopathology may be limited by the volume and quality of annotated examples used to train these models. Large-scale experiments on supervised image classification problems have shown that model performance continues to improve, up through an order of 50 million training examples. Manually annotating this volume of data may be prohibitively expensive both in time and cost, and it can be a severe limitation in ensuring systems perform at a clinically relevant level and generalize across institutions.

The foregoing general description and the following detailed description are exemplary and explanatory only and are not restrictive of the disclosure. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for developing weakly supervised multi-label and multi-task learning for computational biomarker detection in digital pathology.

A computer-implemented method for processing an electronic image corresponding to a specimen includes: receiving one or more digital images associated with a tissue specimen, receiving one or more electronic slide images associated with a tissue specimen, the tissue specimen being associated with a patient and/or medical case; partitioning a first slide image of the one or more electronic slide images into a plurality of tiles; detecting a plurality of tissue regions of the first slide image and/or plurality of tiles to generate a tissue mask; determining whether any of the plurality of tiles corresponds to non-tissue; removing any of the plurality of tiles that are determined to be non-tissue; determining a prediction, using a machine learning prediction model, for at least one label for the one or more electronic slide images, the machine learning prediction model having been generated by processing a plurality of training images; and outputting the prediction of the trained machine learning prediction model.

A system for processing an electronic image corresponding to a specimen includes a memory storing instructions; and at least one processor executing the instructions to perform a process including receiving one or more digital images associated with a tissue specimen, receiving one or more electronic slide images associated with a tissue specimen, the tissue specimen being associated with a patient and/or medical case; partitioning a first slide image of the one or more electronic slide images into a plurality of tiles; detecting a plurality of tissue regions of the first slide image and/or plurality of tiles to generate a tissue mask; determining whether any of the plurality of tiles corresponds to non-tissue; removing any of the plurality of tiles that are determined to be non-tissue; determining a prediction, using a machine learning prediction model, for at least one label for the one or more electronic slide images, the machine learning prediction model having been generated by processing a plurality of training images; and outputting the prediction of the trained machine learning prediction model.

A non-transitory computer-readable medium storing instructions that, when executed by a processor, cause the processor to perform a method for processing an electronic image corresponding to a specimen includes: receiving one or more digital images associated with a tissue specimen, receiving one or more electronic slide images associated with a tissue specimen, the tissue specimen being associated with a patient and/or medical case; partitioning a first slide image of the one or more electronic slide images into a plurality of tiles; detecting a plurality of tissue regions of the first slide image and/or plurality of tiles to generate a tissue mask; determining whether any of the plurality of tiles corresponds to non-tissue; removing any of the plurality of tiles that are determined to be non-tissue; determining a prediction, using a machine learning prediction model, for at least one label for the one or more electronic slide images, the machine learning prediction model having been generated by processing a plurality of training images; and outputting the prediction of the trained machine learning prediction model.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 11 depicts an exemplary system that may execute techniques presented herein.

DESCRIPTION OF THE EMBODIMENTS

Figure 1A:
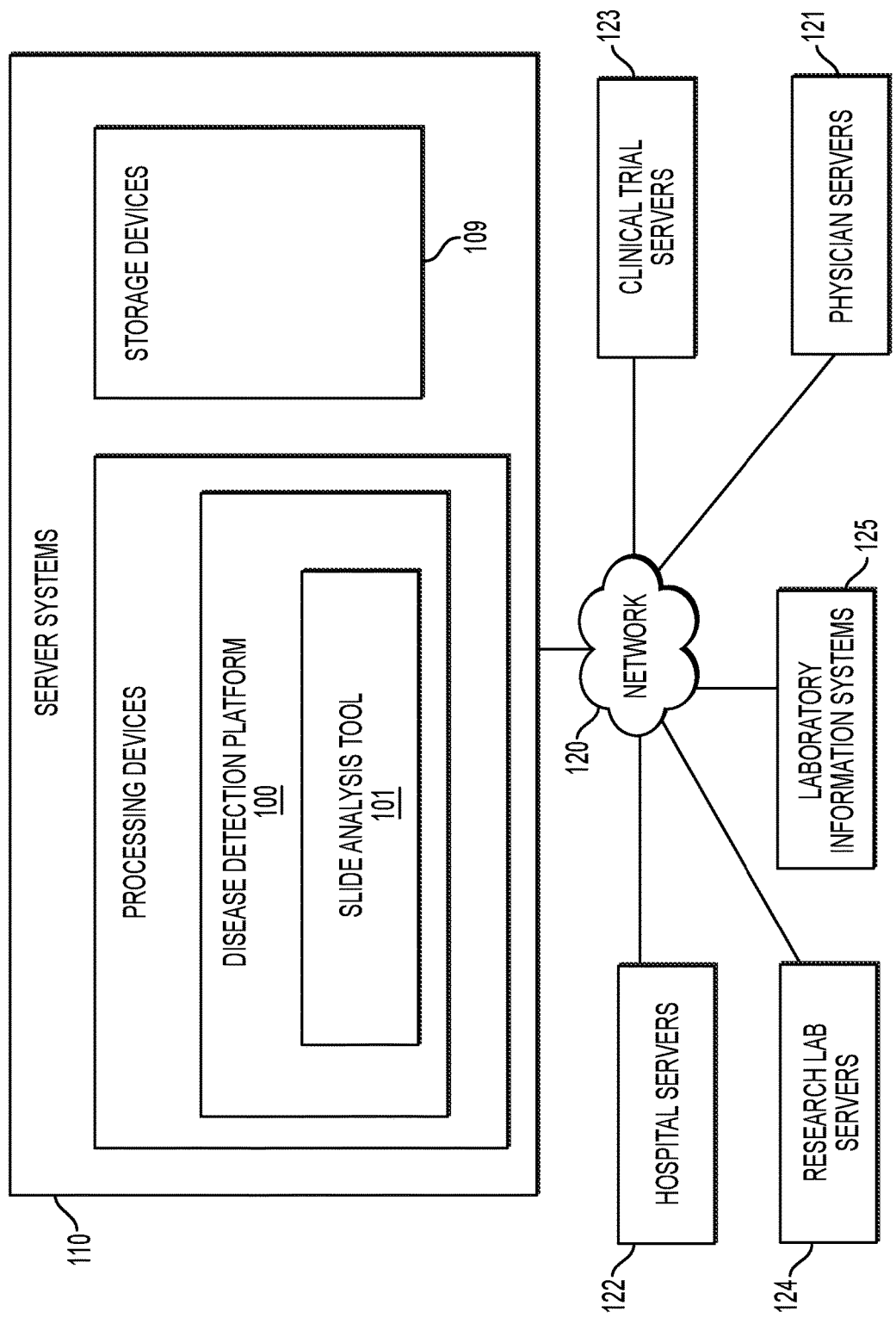
FIG. 1A illustrates an exemplary block diagram of a system and network for creating a prediction model, according to an exemplary embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that these steps must be performed in the order presented but may instead by performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Pathology refers to the study of diseases, as well as the causes and effects of disease. More specifically, pathology refers to performing tests and analysis that are used to diagnose diseases. For example, tissue samples may be placed onto slides to be viewed under a microscope by a pathologist (e.g., a physician that is an expert at analyzing tissue samples to determine whether any abnormalities exist). That is, pathology specimens may be cut into multiple sections, stained, and prepared as slides for a pathologist to examine and render a diagnosis. When uncertain of a diagnostic finding on a slide, a pathologist may order additional cut levels, stains, or other tests to gather more information from the tissue. Technician(s) may then create new slide(s) that may contain the additional information for the pathologist to use in making a diagnosis. This process of creating additional slides may be time-consuming, not only because it may involve retrieving the block of tissue, cutting it to make a new a slide, and then staining the slide, but also because it may be batched for multiple orders. This may significantly delay the final diagnosis that the pathologist renders. In addition, even after the delay, there may still be no assurance that the new slide(s) will have information sufficient to render a diagnosis.

Pathologists may evaluate cancer and other disease pathology slides in isolation. The present disclosure presents a consolidated workflow for improving diagnosis of cancer and other diseases. The workflow may integrate, for example, slide evaluation, tasks, image analysis and cancer detection artificial intelligence (AI), annotations, consultations, and recommendations in one workstation. In particular, the present disclosure describes various exemplary user interfaces available in the workflow, as well as AI tools that may be integrated into the workflow to expedite and improve a pathologist's work.

For example, computers may be used to analyze an image of a tissue sample to quickly identify whether additional information may be needed about a particular tissue sample, and/or to highlight to a pathologist an area in which he or she should look more closely. Thus, the process of obtaining additional stained slides and tests may be done automatically before being reviewed by a pathologist. When paired with automatic slide segmenting and staining machines, this may provide a fully automated slide preparation pipeline. This automation has, at least, the benefits of (1) minimizing an amount of time wasted by a pathologist determining a slide to be insufficient to make a diagnosis, (2) minimizing the (average total) time from specimen acquisition to diagnosis by avoiding the additional time between when additional tests are ordered and when they are produced, (3) reducing the amount of time per recut and the amount of material wasted by allowing recuts to be done while tissue blocks (e.g., pathology specimens) are in a cutting desk, (4) reducing the amount of tissue material wasted/discarded during slide preparation, (5) reducing the cost of slide preparation by partially or fully automating the procedure, (6) allowing automatic customized cutting and staining of slides that would result in more representative/informative slides from samples, (7) allowing higher volumes of slides to be generated per tissue block, contributing to more informed/precise diagnoses by reducing the overhead of requesting additional testing for a pathologist, and/or (8) identifying or verifying correct properties (e.g., pertaining to a specimen type) of a digital pathology image, etc.

The process of using computers to assist pathologists is known as computational pathology. Computing methods used for computational pathology may include, but are not limited to, statistical analysis, autonomous or machine learning, and AI. AI may include, but is not limited to, deep learning, neural networks, classifications, clustering, and regression algorithms. By using computational pathology, lives may be saved by helping pathologists improve their diagnostic accuracy, reliability, efficiency, and accessibility. For example, computational pathology may be used to assist with detecting slides suspicious for cancer, thereby allowing pathologists to check and confirm their initial assessments before rendering a final diagnosis.

As described above, computational pathology processes and devices of the present disclosure may provide an integrated platform allowing a fully automated process including data ingestion, processing and viewing of digital pathology images via a web-browser or other user interface, while integrating with a laboratory information system (LIS). Further, clinical information may be aggregated using cloud-based data analysis of patient data. The data may come from hospitals, clinics, field researchers, etc., and may be analyzed by machine learning, computer vision, natural language processing, and/or statistical algorithms to do real-time monitoring and forecasting of health patterns at multiple geographic specificity levels.

Histopathology refers to the study of a specimen that has been placed onto a slide. For example, a digital pathology image may be comprised of a digitized image of a microscope slide containing the specimen (e.g., a smear). One method a pathologist may use to analyze an image on a slide is to identify nuclei and classify whether a nucleus is normal (e.g., benign) or abnormal (e.g., malignant). To assist pathologists in identifying and classifying nuclei, histological stains may be used to make cells visible. Many dye-based staining systems have been developed, including periodic acid-Schiff reaction, Masson's trichrome, nissl and methylene blue, and Haemotoxylin and Eosin (H&E). For medical diagnosis, H&E is a widely used dye based method, with hematoxylin staining cell nuclei blue, eosin staining cytoplasm and extracellular matrix pink, and other tissue regions taking on variations of these colors. In many cases, however, H&E-stained histologic preparations do not provide sufficient information for a pathologist to visually identify biomarkers that can aid diagnosis or guide treatment. In this situation, techniques such as immunohistochemistry (IHC), immunofluorescence, in situ hybridization (ISH), or fluorescence in situ hybridization (FISH), may be used. IHC and immunofluorescence involve, for example, using antibodies that bind to specific antigens in tissues enabling the visual detection of cells expressing specific proteins of interest, which can reveal biomarkers that are not reliably identifiable to trained pathologists based on the analysis of H&E stained slides. ISH and FISH may be employed to assess the number of copies of genes or the abundance of specific RNA molecules, depending on the type of probes employed (e.g. DNA probes for gene copy number and RNA probes for the assessment of RNA expression). If these methods also fail to provide sufficient information to detect some biomarkers, genetic testing of the tissue may be used to confirm if a biomarker is present (e.g., overexpression of a specific protein or gene product in a tumor, amplification of a given gene in a cancer).

A digitized image may be prepared to show a stained microscope slide, which may allow a pathologist to manually view the image on a slide and estimate a number of stained abnormal cells in the image. However, this process may be time consuming and may lead to errors in identifying abnormalities because some abnormalities are difficult to detect. Computational processes and devices may be used to assist pathologists in detecting abnormalities that may otherwise be difficult to detect. For example, AI may be used to predict biomarkers (such as the overexpression of a protein and/or gene product, amplification, or mutations of specific genes) from salient regions within digital images of tissues stained using H&E and other dye-based methods. The images of the tissues could be whole slide images (WSI), images of tissue cores within microarrays or selected areas of interest within a tissue section. Using staining methods like H&E, these biomarkers may be difficult for humans to visually detect or quantify without the aid of additional testing. Using AI to infer these biomarkers from digital images of tissues has the potential to improve patient care, while also being faster and less expensive.

The detected biomarkers or the image alone could then be used to recommend specific cancer drugs or drug combination therapies to be used to treat a patient, and the AI could identify which drugs or drug combinations are unlikely to be successful by correlating the detected biomarkers with a database of treatment options. This can be used to facilitate the automatic recommendation of immunotherapy drugs to target a patient's specific cancer. Further, this could be used for enabling personalized cancer treatment for specific subsets of patients and/or rarer cancer types.

As described above, computational pathology processes and devices of the present disclosure may provide an integrated platform allowing a fully automated process including data ingestion, processing and viewing of digital pathology images via a web-browser or other user interface, while integrating with a laboratory information system (LIS). Further, clinical information may be aggregated using cloud-based data analysis of patient data. The data may come from hospitals, clinics, field researchers, etc., and may be analyzed by machine learning, computer vision, natural language processing, and/or statistical algorithms to do real-time monitoring and forecasting of health patterns at multiple geographic specificity levels.

The digital pathology images described above may be stored with tags and/or labels pertaining to the properties of the specimen or the digital pathology image and such tags/labels may be incomplete. Accordingly, systems and methods disclosed herein predict at least one label from a collection of digital images.

The performance of machine learning and deep learning models for histopathology may be limited by the volume and quality of annotated examples used to train these models. Large-scale experiments on supervised image classification problems have shown that model performance continues to improve, up through an order of 50 million training examples. Most clinically relevant tasks in pathology entail much more than classification, however. When a pathologist renders a diagnosis, the diagnosis may take the form of a report that contains many heterogeneous interrelated fields and pertains to an entire slide or set of slides. In oncology, these fields can include the presence of cancer, cancer grades, tumor quantification, cancer grade group, presence of various features important for staging of the cancer, etc. In pre-clinical drug research animal studies, these fields could include the presence of toxicity, the severity of toxicity, and the kind of toxicity. Procuring the necessary annotations to train most supervised deep learning models may involve a pathologist labeling individual pixels, tiles (e.g., one or more relatively small rectangular regions in a slide image), or regions of interest (e.g., polygons) from the slide image with an appropriate annotation. For each field in the report, a different set of training annotations may be used. Furthermore, a typical digital pathology slide can contain on the order of 10 gigapixels, or more than 100,000 tiles. Manually annotating this volume of data may be prohibitively expensive both in time and cost, and it can be a severe limitation in ensuring systems perform at a clinically relevant level and generalize across institutions. Accordingly, a desire exists to generate training data that can be used for histopathology.

The embodiments of the present disclosure may overcome the above limitations. In particular, embodiments disclosed herein may use weak supervision, in which a deep learning model may be trained directly from a pathologist's diagnosis, rather than with additional labeling of each pixel or tile in a digital image. A machine learning or deep learning model may comprise a machine learning algorithm, in some embodiments. One technique may determine binary cancer detection, however techniques discussed herein further disclose, for example, how a deep learning system may be trained in a weakly supervised multi-label and multi-task setting to perform grading, subtyping, inferring multiple disease attributes simultaneously, and more. This enables systems to be trained directly from diagnostic reports or test results without the need for extensive annotations, reducing the number of required training labels by five orders of magnitude or more.

The disclosed systems and methods may automatically predict the specimen or image properties, without relying on the stored tags or labels. Further, systems and methods are disclosed for quickly and correctly identifying and/or verifying a specimen type of a digital pathology image, or any information related to a digital pathology image, without necessarily accessing an LIS or analogous information database. One embodiment of the present disclosure may include a system trained to identify various properties of a digital pathology image, based on datasets of prior digital pathology images. The trained system may provide a classification for a specimen shown in a digital pathology image. The classification may help to provide treatment or diagnosis prediction(s) for a patient associated with the specimen.

This disclosure includes one or more embodiments of a slide analysis tool. The input to the tool may include a digital pathology image and any relevant additional inputs. Outputs of the tool may include global and/or local information about the specimen. A specimen may include a biopsy or surgical resection specimen.

FIG. 1A illustrates a block diagram of a system and network for determining specimen property or image property information pertaining to digital pathology image(s), using machine learning, according to an exemplary embodiment of the present disclosure.

Specifically, FIG. 1A illustrates an electronic network 120 that may be connected to servers at hospitals, laboratories, and/or doctors' offices, etc. For example, physician servers 121, hospital servers 122, clinical trial servers 123, research lab servers 124, and/or laboratory information systems 125, etc., may each be connected to an electronic network 120, such as the Internet, through one or more computers, servers, and/or handheld mobile devices. According to an exemplary embodiment of the present application, the electronic network 120 may also be connected to server systems 110, which may include processing devices that are configured to implement a disease detection platform 100, which includes a slide analysis tool 101 for determining specimen property or image property information pertaining to digital pathology image(s), and using machine learning to classify a specimen, according to an exemplary embodiment of the present disclosure.

The physician servers 121, hospital servers 122, clinical trial servers 123, research lab servers 124, and/or laboratory information systems 125 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 121, hospital servers 122, clinical trial servers 123, research lab servers 124, and/or laboratory information systems 125 may also obtain any combination of patient-specific information, such as age, medical history, cancer treatment history, family history, past biopsy or cytology information, etc. The physician servers 121, hospital servers 122, clinical trial servers 123, research lab servers 124, and/or laboratory information systems 125 may transmit digitized slide images and/or patient-specific information to server systems 110 over the electronic network 120. Server systems 110 may include one or more storage devices 109 for storing images and data received from at least one of the physician servers 121, hospital servers 122, clinical trial servers 123, research lab servers 124, and/or laboratory information systems 125. Server systems 110 may also include processing devices for processing images and data stored in the one or more storage devices 109. Server systems 110 may further include one or more machine learning tool(s) or capabilities. For example, the processing devices may include a machine learning tool for a disease detection platform 100, according to one embodiment. Alternatively or in addition, the present disclosure (or portions of the system and methods of the present disclosure) may be performed on a local processing device (e.g., a laptop).

The physician servers 121, hospital servers 122, clinical trial servers 123, research lab servers 124, and/or laboratory information systems 125 refer to systems used by pathologists for reviewing the images of the slides. In hospital settings, tissue type information may be stored in a laboratory information systems 125. However, the correct tissue classification information is not always paired with the image content. Additionally, even if an LIS is used to access the specimen type for a digital pathology image, this label may be incorrect due to the fact that many components of an LIS may be manually inputted, leaving a large margin for error. According to an exemplary embodiment of the present disclosure, a specimen type may be identified without needing to access the laboratory information systems 125, or may be identified to possibly correct laboratory information systems 125. For example, a third party may be given anonymized access to the image content without the corresponding specimen type label stored in the LIS. Additionally, access to LIS content may be limited due to its sensitive content.

Figure 1B:
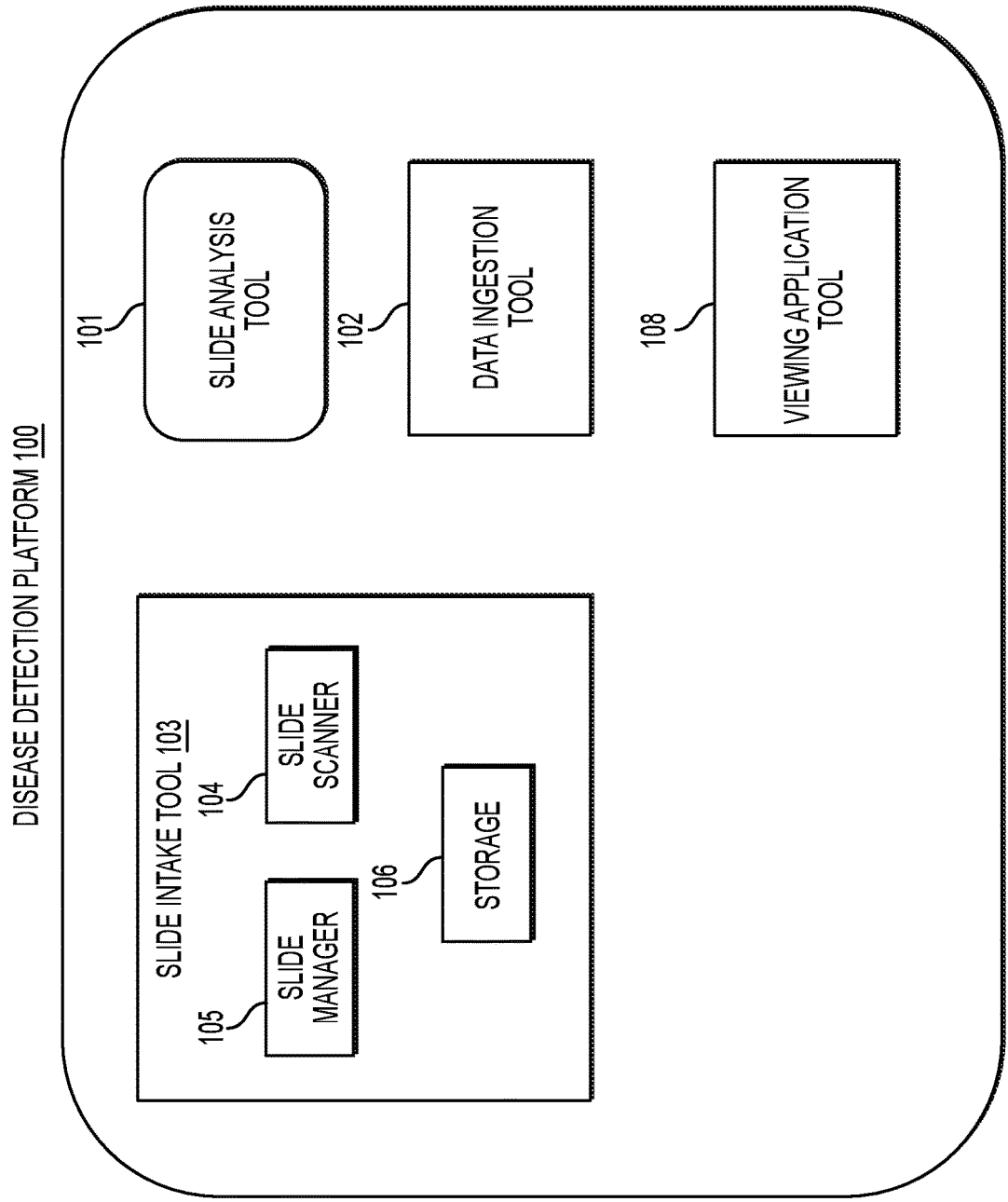
FIG. 1B illustrates an exemplary block diagram of a prediction model platform, according to an exemplary embodiment of the present disclosure.

FIG. 1B illustrates an exemplary block diagram of a disease detection platform 100 for determining specimen property or image property information pertaining to digital pathology image(s), using machine learning. For example, the disease detection platform 100 may include a slide analysis tool 101, a data ingestion tool 102, a slide intake tool 103, a slide scanner 104, a slide manager 105, a storage 106, and a viewing application tool 108.

The slide analysis tool 101, as described below, refers to a process and system for processing digital images associated with a tissue specimen, and using machine learning to analyze a slide, according to an exemplary embodiment.

The data ingestion tool 102 refers to a process and system for facilitating a transfer of the digital pathology images to the various tools, modules, components, and devices that are used for classifying and processing the digital pathology images, according to an exemplary embodiment.

The slide intake tool 103 refers to a process and system for scanning pathology images and converting them into a digital form, according to an exemplary embodiment. The slides may be scanned with slide scanner 104, and the slide manager 105 may process the images on the slides into digitized pathology images and store the digitized images in storage 106.

The viewing application tool 108 refers to a process and system for providing a user (e.g., a pathologist) with specimen property or image property information pertaining to digital pathology image(s), according to an exemplary embodiment. The information may be provided through various output interfaces (e.g., a screen, a monitor, a storage device, and/or a web browser, etc.).

The slide analysis tool 101, and each of its components, may transmit and/or receive digitized slide images and/or patient information to server systems 110, physician servers 121, hospital servers 122, clinical trial servers 123, research lab servers 124, and/or laboratory information systems 125 over an electronic network 120. Further, server systems 110 may include one or more storage devices 109 for storing images and data received from at least one of the slide analysis tool 101, the data ingestion tool 102, the slide intake tool 103, the slide scanner 104, the slide manager 105, and viewing application tool 108. Server systems 110 may also include processing devices for processing images and data stored in the storage devices. Server systems 110 may further include one or more machine learning tool(s) or capabilities, e.g., due to the processing devices. Alternatively or in addition, the present disclosure (or portions of the system and methods of the present disclosure) may be performed on a local processing device (e.g., a laptop).

Any of the above devices, tools and modules may be located on a device that may be connected to an electronic network 120, such as the Internet or a cloud service provider, through one or more computers, servers, and/or handheld mobile devices.

Figure 1C:
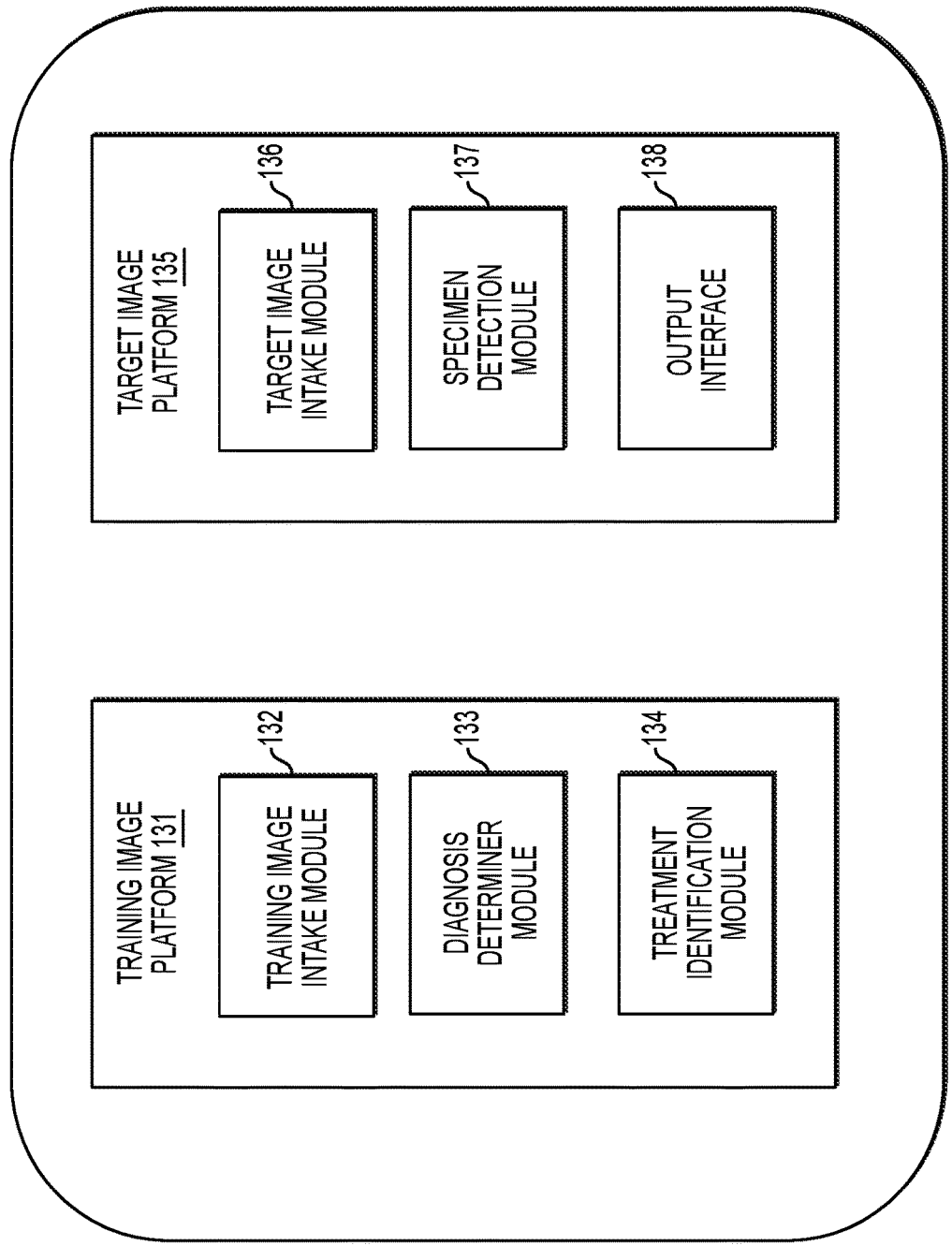
FIG. 1C illustrates an exemplary block diagram of a slide analysis tool, according to an exemplary embodiment of the present disclosure.

FIG. 1C illustrates an exemplary block diagram of a slide analysis tool 101, according to an exemplary embodiment of the present disclosure. The slide analysis tool 101 may include a training image platform 131 and/or a target image platform 135.

The training image platform 131, according to one embodiment, may create or receive training images that are used to train a machine learning system to effectively analyze and classify digital pathology images. For example, the training images may be received from any one or any combination of the server systems 110, physician servers 121, hospital servers 122, clinical trial servers 123, research lab servers 124, and/or laboratory information systems 125. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hemotoxylin alone, IHC, molecular pathology, etc.; and/or (b) digitized tissue samples from a 3D imaging device, such as microCT.

The training image intake module 132 may create or receive a dataset comprising one or more training images corresponding to either or both of images of a human tissue and images that are graphically rendered. For example, the training images may be received from any one or any combination of the server systems 110, physician servers 121, hospital servers 122, clinical trial servers 123, research lab servers 124, and/or laboratory information systems 125. This dataset may be kept on a digital storage device. The quality score determiner module 133 may identify quality control (QC) issues (e.g., imperfections) for the training images at a global or local level that may greatly affect the usability of a digital pathology image. For example, the quality score determiner module may use information about an entire image, e.g., the specimen type, the overall quality of the cut of the specimen, the overall quality of the glass pathology slide itself, or tissue morphology characteristics, and determine an overall quality score for the image. The treatment identification module 134 may analyze images of tissues and determine which digital pathology images have treatment effects (e.g., post-treatment) and which images do not have treatment effects (e.g., pre-treatment). It is useful to identify whether a digital pathology image has treatment effects because prior treatment effects in tissue may affect the morphology of the tissue itself. Most LIS do not explicitly keep track of this characteristic, and thus classifying specimen types with prior treatment effects can be desired.

According to one embodiment, the target image platform 135 may include a target image intake module 136, a specimen detection module 137, and an output interface 138. The target image platform 135 may receive a target image and apply the machine learning model to the received target image to determine a characteristic of a target specimen. For example, the target image may be received from any one or any combination of the server systems 110, physician servers 121, hospital servers 122, clinical trial servers 123, research lab servers 124, and/or laboratory information systems 125. The target image intake module 136 may receive a target image corresponding to a target specimen. The specimen detection module 137 may apply the machine learning model to the target image to determine a characteristic of the target specimen. For example, the specimen detection module 137 may detect a specimen type of the target specimen. The specimen detection module 137 may also apply the machine learning model to the target image to determine a quality score for the target image. Further, the specimen detection module 137 may apply the machine learning model to the target specimen to determine whether the target specimen is pretreatment or post-treatment.

The output interface 138 may be used to output information about the target image and the target specimen (e.g., to a screen, monitor, storage device, web browser, etc.).

Figure 2A:
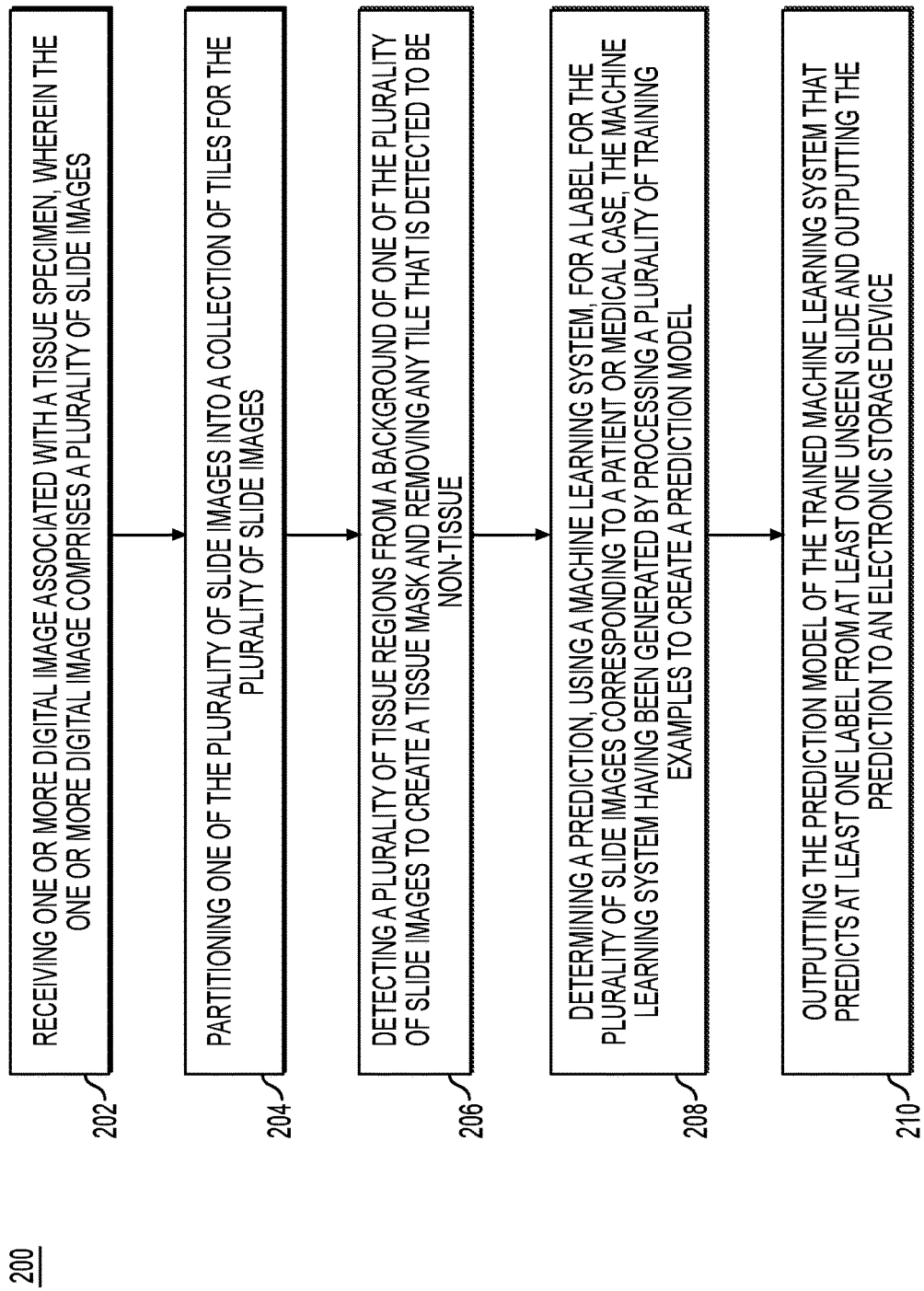
FIG. 2A is a flowchart illustrating an exemplary method for using a prediction model created by a trained machine learning system, according to one or more exemplary embodiments of the present disclosure.

FIG. 2A is a flowchart illustrating an exemplary method for using a prediction model created by a trained machine learning system, according to one or more exemplary embodiments of the present disclosure. For example, an exemplary method 200 (steps 202-210) may be performed by slide analysis tool 101 automatically or in response to a request from a user.

According to one embodiment, the exemplary method 200 for using a prediction model may include one or more of the following steps. In step 202, the method may include receiving one or more digital images associated with a tissue specimen, wherein the one or more digital image comprises a plurality of slide images. The digital storage device may comprise a hard drive, a network drive, a cloud storage, a random access memory (RAM), or any other suitable storage device.

In step 204, the method may include partitioning one of the plurality of slide images into a collection of tiles for the plurality of slide images.

In step 206, the method may include detecting a plurality of tissue regions from a background of the one of plurality of slide images to create a tissue mask and removing at least one tile of the collection of tiles that is detected to be non-tissue. The tile that is non-tissue may comprise a background of the slide image. This may be accomplished in a variety of ways, including: thresholding based methods based on color, color intensity, texture features or Otsu's method, followed by running a connected components algorithm; segmentation algorithms, such as k-means, graph cuts, mask region convolutional neural network (Mask R-CNN); or any other suitable methods.

In step 208, the method may include determining a prediction, using a machine learning system, for a label for the plurality of slide images corresponding to a patient or medical case, the machine learning system having been generated by processing a plurality of training examples to create a prediction model. The training examples may comprise a set of one or more digital slide images and a plurality of target labels.

In step 210, the method may include outputting the prediction model of the training machine learning system that predicts at least one label from at least one slide that was not used for training the machine learning system and outputting the prediction to an electronic storage device.

Figure 2B:
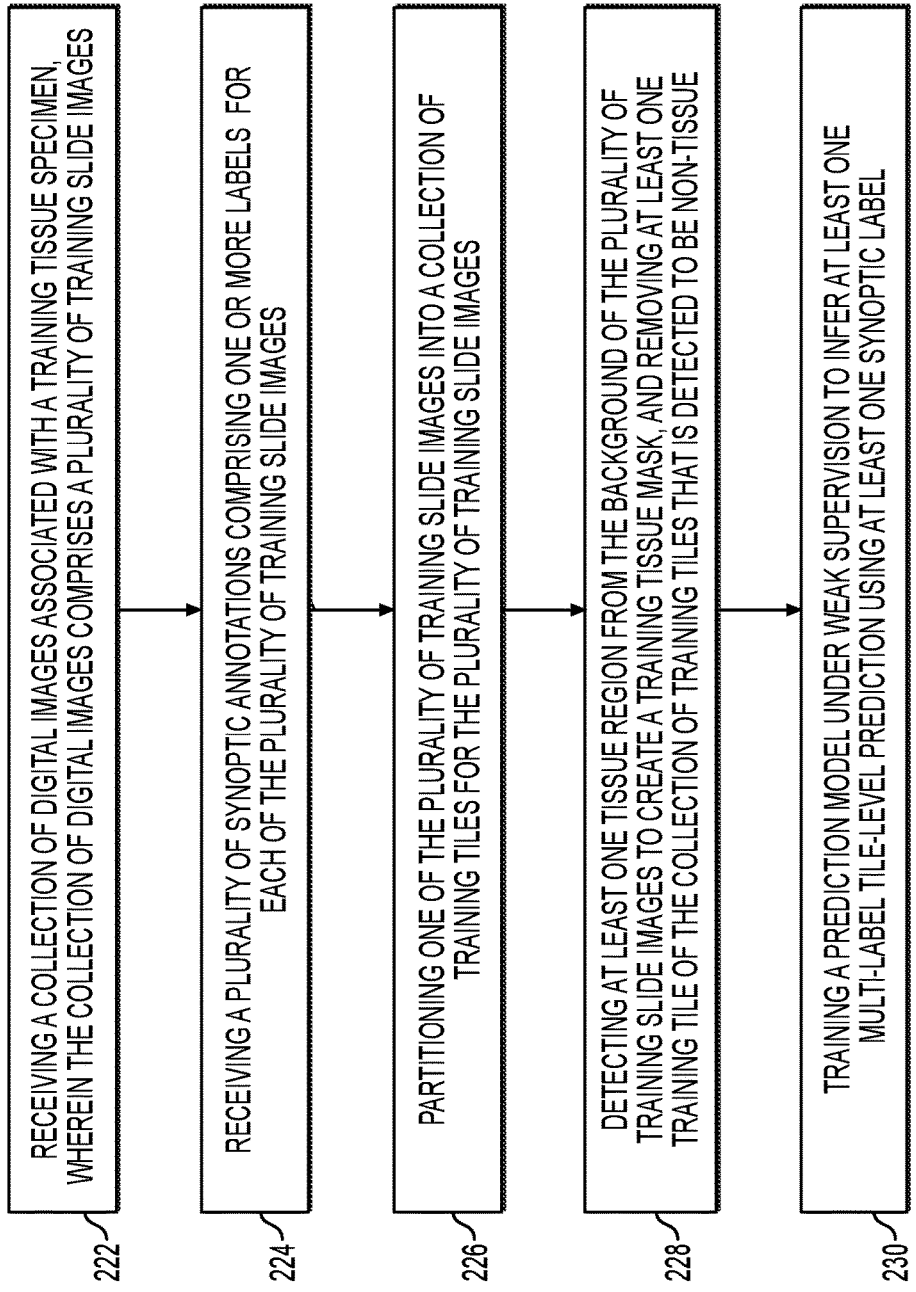
FIG. 2B is a flowchart illustrating an exemplary method for training a weakly supervised tile-level learning module in a trained machine learning system, according to one or more exemplary embodiments of the present disclosure.

FIG. 2B is a flowchart illustrating an exemplary method for training a weakly supervised tile-level learning module in a trained machine learning system, according to one or more exemplary embodiments of the present disclosure. The weakly supervised learning module may train a model to make tile-level predictions using slide-level training labels. For example, an exemplary method 220 (steps 222-230) may be performed by slide analysis tool 101 automatically or in response to a request from a user.

According to one embodiment, the exemplary method 220 for using a prediction model may include one or more of the following steps. In step 222, the method may include receiving a collection of digital images associated with a training tissue specimen into a digital storage device, wherein the collection of digital images comprise a plurality of training slide images. The digital storage device may comprise a hard drive, a network drive, a cloud storage, a random access memory (RAM), or any other suitable storage device.

In step 224, the method may include receiving a plurality of synoptic annotations comprising one or more labels for each of the plurality of training slide images. The labels may be binary, multi-level binary, categorical, ordinal or real valued.

In step 226, the method may include partitioning one of the plurality of training slide images into a collection of training tiles for the plurality of training slide images.

In step 228, the method may include detecting at least one tissue region from the background of the plurality of training slide images to create a training tissue mask, and removing at least one training tile of the collection of training tiles that is detected to be non-tissue. This may be achieved in a variety of ways, including but not limited to: thresholding methods, based on color, color intensity, texture features, Otsu's method, or any other suitable method, followed by running a connected components algorithm and segmentation algorithms such as k-means, graph cuts, Mask R-CNN, or any other suitable method.

In step 230, the method may include training a prediction model under weak supervision to infer at least one multi-label tile-level prediction using at least one synoptic label. There may be four general approaches for training a model under a weak-supervision setting, but any suitable approach to training the model may be used.

1. Multiple Instance Learning (MIL) may be used to train a tile-level prediction model for binary or categorical labels by learning to identify tiles that contain a target label of the slide. This identification may be accomplished by finding salient tiles (e.g., maximal scoring tiles based on received synoptic annotations or labels at each training iteration), and using these tiles to update a classifier using the received synoptic training label(s) associated with each salient tile. For example, the classifier may be trained to identify cancer based on a collection of overlapping tiles. As salient tiles are determined, the synoptic labels may be used to update the tile-level labels. This tile-level label and classifier may then determine or provide a label for a group of tiles. MIL may also be used to train a machine learning model to extract diagnostic features for other downstream tasks such as cancer grading, cancer subtyping, biomarker detection, etc.

2. Multiple Instance Multiple Label Learning (MIMLL) may be a tile-level prediction model comprising a generalization of MIL that treats each slide as a set of tiles that may be associated with multiple labels, rather than only a single binary label as in MIL. These slide labels may come from a pathologist's diagnostic report, genetic testing, immunological testing, or other measurements/assays. The MIMLL model may be trained to select tiles that correspond to each of the synoptic training labels belonging to the set of one or more slides. The present embodiment may involve the MIMLL training a neural network (e.g., a Convolutional Neural Network (CNN), capsule network, etc.) by iterating the following steps:

a. For each label of the labels to be predicted, select the most relevant set of tiles using a scoring function. The scoring function may be formulated to rank multiple tiles simultaneously. For example, with multiple binary labels, a CNN may be run on each tile that attempts to predict each of the multiple binary labels from every tile in a set of slides, and the tiles with the outputs closest to 1 for one or more of the labels may be selected.

b. Use the selected tiles to update the weights of the CNN model with respect to their associated label assignments. Each label may have its own output layer in the model.

Similar to the MIL model, the MIMLL model may also be used to extract diagnostic features for other downstream tasks.

3. Self-supervised learning may use a small amount of tile-level training data to create an initial tile-based classifier using supervised learning. This initial classifier may be used to bootstrap a full training process by alternating the following:

a. Reassign tile labels in the training set using predictions from the current tile-based model.

b. Update the model for each tile with respect to the latest label assignments.

4. Unsupervised clustering may learn to group similar instances together without the use of target labels. Slide tiles may be treated as instances, and the number of groupings may either be pre-specified or learned automatically by the algorithm. Such clustering algorithms may include, but are not limited to the following methods:
a. Expectation maximization (EM)
b. Majorization maximization (MM)
c. K-nearest neighbor (KNN)
d. Hierarchical clustering
e. Agglomerative clustering The resulting model may be used to extract diagnostic features to be used by the slide-level prediction module.

Figure 2C:
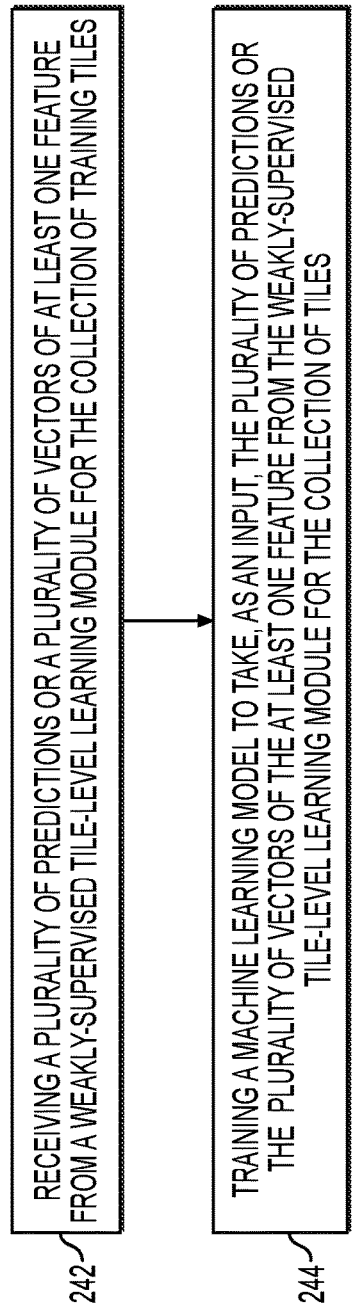
FIG. 2C is a flowchart illustrating an exemplary method for training a weakly supervised aggregation module in a trained machine learning system, according to one or more exemplary embodiments of the present disclosure.

FIG. 2C is a flowchart illustrating an exemplary method for training a weakly supervised aggregation module in a trained machine learning system, according to one or more exemplary embodiments of the present disclosure. For example, an exemplary method 240 (steps 242-244) may be performed by slide analysis tool 101 automatically or in response to a request from a user.

According to one embodiment, the exemplary method 240 for training the weakly supervised aggregation module may include one or more of the following steps. In step 242, the method may include receiving a plurality of predictions or a plurality of vectors of at least one feature from a weakly-supervised tile-level learning module for the collection of training tiles.

In step 244, the method may include training a machine learning model to take, as an input, the plurality of predictions or the plurality of vectors of the at least one feature from the weakly-supervised tile-level learning module for the collection of tiles. This aggregation module may train a multi-task slide-level aggregation model to take tile-level inputs and produce a final prediction for the tiles input into a system and/or slide images input into a system. A general form of the model may be comprised of multiple outputs (e.g., multi-task learning), and each label may be binary, categorical, ordinal or real valued. The tile-level inputs may include image features of any type, including but not limited to:
a. Outputs (e.g., feature vectors or embeddings) from the weakly supervised model
b. CNN features
c. Scale-Invariant Feature Transform (SIFT)
d. Speeded-Up Robust Features (SURF)
e. Rotation Invariant Feature Transform (RIFT)
f. Oriented FAST and Rotated BRIEF (ORB)

The multi-task slide-level aggregation model of the aggregation module may take many forms, including but not limited to:
a. Fully connected neural network trained with multiple output task groups
b. CNN
c. Fully-convolutional neural networks
d. Recurrent neural network (RNN), including gated recurrent unit (GRU) and long-short term memory (LSTM) networks
e. Graph neural networks
f. Transformer networks
g. Random forest, boosted forest, XGBoost, etc.

Figure 3:
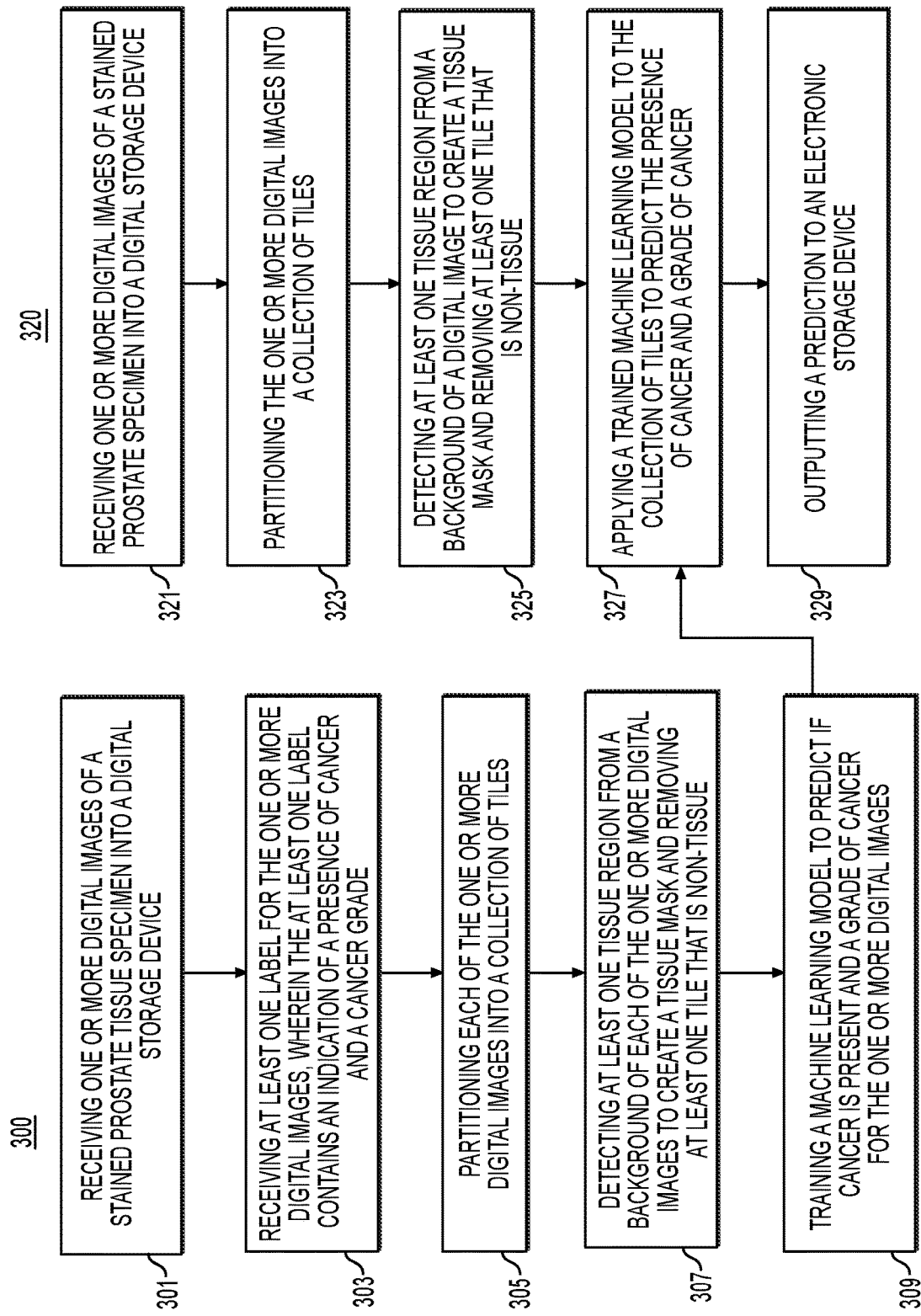
FIG. 3 is a flowchart illustrating an exemplary method for training and using a machine learning system to simultaneously detect and grade prostate cancer, according to one or more exemplary embodiments of the present disclosure.

FIG. 3 is a flowchart illustrating an exemplary method for training and using a machine learning system for simultaneously detect and grade prostate cancer, according to one or more exemplary embodiments of the present disclosure. Cancer grading may measure the differentiation of cancer cells from normal tissue, and it may be assessed at both a local level by inspecting the cell morphology as well as slide-level summaries containing the relative quantities of grades. Grading may be performed as part of a pathologist's diagnostic report for common cancers such as prostate, kidney and breast. The exemplary methods 300 and 320 may be used to train and use a machine learning system to simultaneously detect and grade prostate cancer.

According to one embodiment, the exemplary methods 300 and 320 may include one or more of the following steps. In step 301, the method may include receiving one or more digital images of a stained prostate tissue specimen into a digital storage device. The digital storage device may comprise a hard drive, a network drive, a cloud storage, a random access memory (RAM), etc.

In step 303, the method may include receiving at least one label for the one or more digital images, wherein the at least one label contains an indication of a presence of cancer and a cancer grade. The cancer grade may comprise a primary and a secondary Gleason grade.

In step 305, the method may include partitioning each of the one or more digital images into a collection of tiles.

In step 307, the method may include detecting at least one tissue region from a background of each of the one or more digital images to create a tissue mask and removing at least one tile that is non-tissue. Detecting tissue regions and removing non-tissue tiles may be accomplished by thresholding methods based on color, color intensity, texture features, Otsu's method, etc., followed by running a connected components algorithm. The thresholding may provide labels on tissue vs. non-tissue regions for one or more pixels of each received slide image, based on the thresholding method. The connected components algorithm may detect image regions or pixels connected to one another, to detect tissue versus non-tissue regions across entire image regions, slide images, or slides. Detecting tissue regions and removing non-tissue tiles may also be accomplished by segmentation algorithms, such as k-means, graph cuts, Mask R-CNN, etc.

In step 309, the method may include training a machine learning model to predict if cancer is present and a grade of cancer for the one or more digital images. Training may be accomplished in a variety of ways, including but not limited to:
a. Training a CNN to predict primary, secondary, and/or tertiary grades using an MIMLL model, as disclosed above, for example, via treating each slide as a set of tiles associated with multiple labels, selecting slides that correspond to synoptic training labels, scoring each tile by its relevance to a label, and updating weights of the CNN model with respect to associated label assignments. The trained CNN may be used to extract embeddings from each tile in a set of slides, to train a multi-task aggregator (e.g., the previously disclosed aggregation model) to predict the presence of cancer, cancer Gleason grade group, and/or the primary, secondary, and tertiary grade of each tile or slide. Alternatively, the prediction output from each tile may be used and aggregated with hand-designed post-processing methods, e.g., having each tile vote for each grade and taking the majority vote.
b. Using a MIL model, classify each tile as cancerous or benign, and transfer the grading labels for the "pure" cases where primary/secondary/tertiary grades are the same grade. Train a tile-level classifier with the transferred labels using supervised learning. Refine the model using self-supervised learning as disclosed in the weakly supervised learning module above.
c. Extract features/embeddings from each tile, and then use the multi-task aggregator (e.g., the aggregation model disclosed above) to predict the presence of cancer, cancer Gleason grade group, and/or the primary, secondary, and tertiary grade. Embeddings may be from a pre-trained CNN, random features, features from an unsupervised clustering model, SIFT, ORB, etc.

In step 321, the method may include receiving one or more digital images of a stained prostate specimen into a digital storage device. The digital storage device may comprise a hard drive, a network drive, a cloud storage, a RAM, etc.

In step 323, the method may include partitioning the one or more digital images into a collection of tiles.

In step 325, the method may include detecting at least one tissue region from a background of a digital image to create a tissue mask and removing at least one tile that is non-tissue. Detecting may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 327, the method may include applying a trained machine learning model to the collection of tiles to predict the presence of cancer and a grade of cancer. The grade of cancer may comprise a cancer Gleason grade group, and/or a primary, a secondary, and a tertiary grade group.

In step 329, the method may include outputting a prediction, for example to an electronic storage device.

Figure 4:
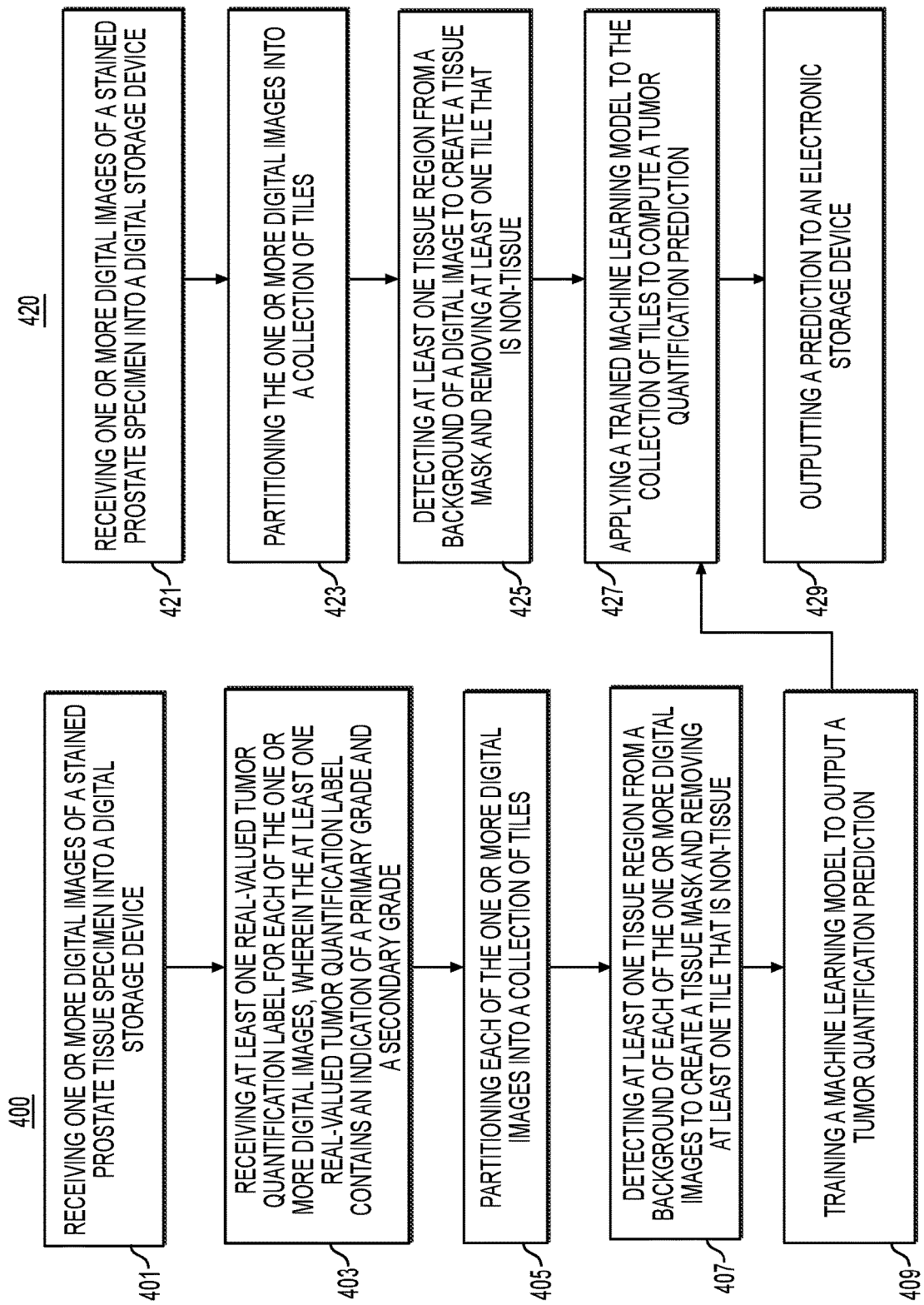
FIG. 4 is a flowchart illustrating an exemplary method for training and using a machine learning system for tumor quantification in prostate needle biopsies, according to one or more exemplary embodiments of the present disclosure.

FIG. 4 is a flowchart illustrating an exemplary method for training and using a machine learning system for tumor quantification in prostate needle biopsies, according to one or more exemplary embodiments of the present disclosure. Tumor quantification for prostate needle biopsies may be comprised of estimating the total and relative volumes of cancer for each cancer grade (e.g., a Gleason grade). Tumor quantification may play an important role in understanding the composition and severity of prostate cancer, and it may be a common element on pathology diagnostic reports. Quantifying tumor size may be traditionally performed manually with a physical ruler on a glass slide. Manual quantification in this manner may suffer from both inaccuracy and consistency. The exemplary methods 400 and 420 may be used to train and use a machine learning system to quantify a tumor in prostate needle biopsies.

According to one embodiment, the exemplary methods 400 and 420 may include one or more of the following steps. In step 401, the method may include receiving one or more digital images of a stained prostate tissue specimen into a digital storage device. The digital storage device may comprise a hard drive, a network drive, a cloud storage, a random access memory (RAM), etc.

In step 403, the method may include receiving at least one real-valued tumor quantification label for each of the one or more digital images, wherein the at least one real-valued tumor quantification label contains an indication of a primary grade and a secondary grade. The label may also include a respective volume, a respective length, and a respective size of the tumor in the one or more digital images.

In step 405, the method may include partitioning each of the one or more digital images into a collection of tiles.

In step 407, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 409, the method may include training a machine learning model to output a cancer grading prediction, as described in exemplary method 300. Tumor quantification estimates may be estimated in many ways, including but not limited to:

a. Counting the number of tiles of grade, and geometrically estimating their volume and ratios relative to the volume of benign tissue.

b. Train a model using a slide-level grading module, e.g., as described in exemplary method 300. This model may take, as input, a tile-level diagnostic features from a machine learning cancer grading prediction model (e.g., the model trained in exemplary method 300), and output each tumor quantification metric using a real valued regression model.

In step 421, the method may include receiving one or more digital images of a stained prostate specimen into a digital storage device. The digital storage device may comprise a hard drive, a network drive, a cloud storage, a random access memory (RAM), etc.

In step 423, the method may include partitioning the one or more digital images into a collection of tiles.

In step 425, the method may include detecting at least one tissue region from a background of a digital image to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 427, the method may include applying a trained machine learning model to the collection of tiles to compute a tumor quantification prediction. The prediction may be output to an electronic storage device. Tumor quantification may be in the form of size metrics or percentages.

In step 429, the method may include outputting a prediction to an electronic storage device.

Figure 5:
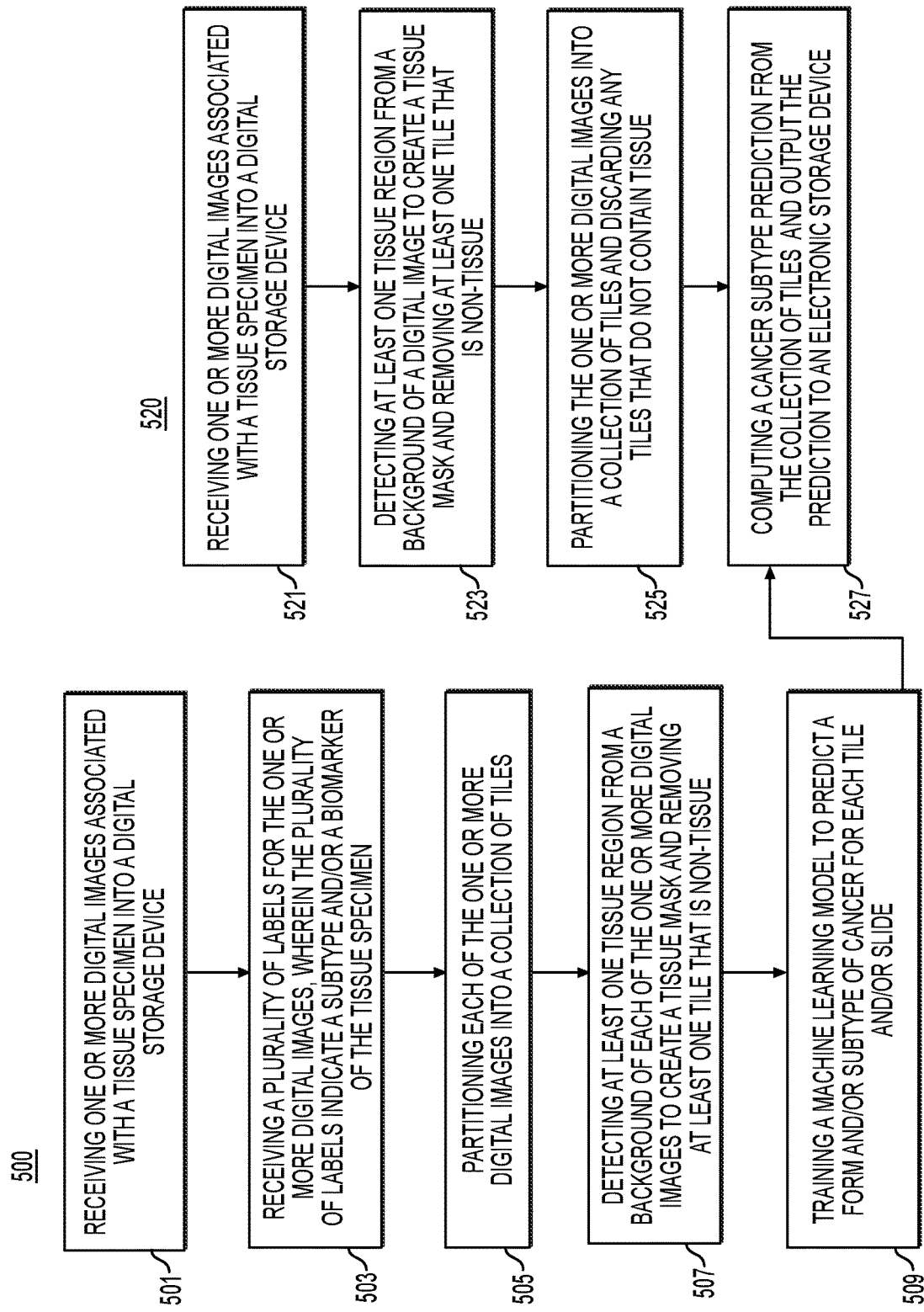
FIG. 5 is a flowchart illustrating an exemplary method for training and using a machine learning system for predicting a cancer subtype, according to one or more exemplary embodiments of the present disclosure.

FIG. 5 is a flowchart illustrating an exemplary method for training and using a machine learning system for predicting a cancer subtype, according to one or more exemplary embodiments of the present disclosure. Many cancers have multiple subtypes. For example, in breast cancer, it may be determined whether a cancer is invasive or not, if it is lobular or ductal, and if various other attributes are present, such as calcifications. This method of predicting a cancer subtype may include a prediction of multiple, non-exclusive, categories that may involve the use of multi-label learning.

According to one embodiment, the exemplary methods 500 and 520 may include one or more of the following steps. In step 501, the method may include receiving one or more digital images associated with a tissue specimen into a digital storage device. The digital storage device may comprise a hard drive, a network drive, a cloud storage, a random access memory (RAM), etc.

In step 503, the method may include receiving a plurality of labels for the one or more digital images, wherein the plurality of labels and/or a biomarker of the tissue specimen. In a breast cancer specimen, a relevant biomarker could be a presence of calcifications, presence or absence of cancer, ductal carcinoma in situ (DCIS), invasive ductal carcinoma (IDC), inflammatory breast cancer (IBC), Paget disease of the breast, angiosarcoma, phyllodes tumor, invasive lobular carcinoma, lobular carcinoma in situ, and various forms of atypia. Labels may not necessarily mutually exclusive and multiple subtypes may be simultaneously observed.

In step 505, the method may include partitioning each of the one or more digital images into a collection of tiles.

In step 507, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 509, the method may include training a machine learning model to predict a form and/or subtype of cancer for each tile and/or slide. Training the machine learning model may be accomplished using the MIMLL model disclosed above. The trained subtype prediction machine learning model may be refined using a slide-level prediction model (e.g., an aggregation model) as disclosed above. The slide-level prediction model may take, as input, tile-level subtype predictions from an MIMLL model, and output slide-level predictions indicating the presence of each cancer subtype.

In step 521, the method may include receiving one or more digital images associated with a tissue specimen into a digital storage device. The digital storage device may comprise a hard drive, a network drive, a cloud storage, a random access memory (RAM), etc.

In step 523, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 525, the method may include partitioning the one or more digital images into a collection of tiles and discarding any tiles that do not contain tissue.

In step 527, the method may include computing a cancer subtype prediction from the collection of tiles and output the prediction to an electronic storage device.

Figure 6:
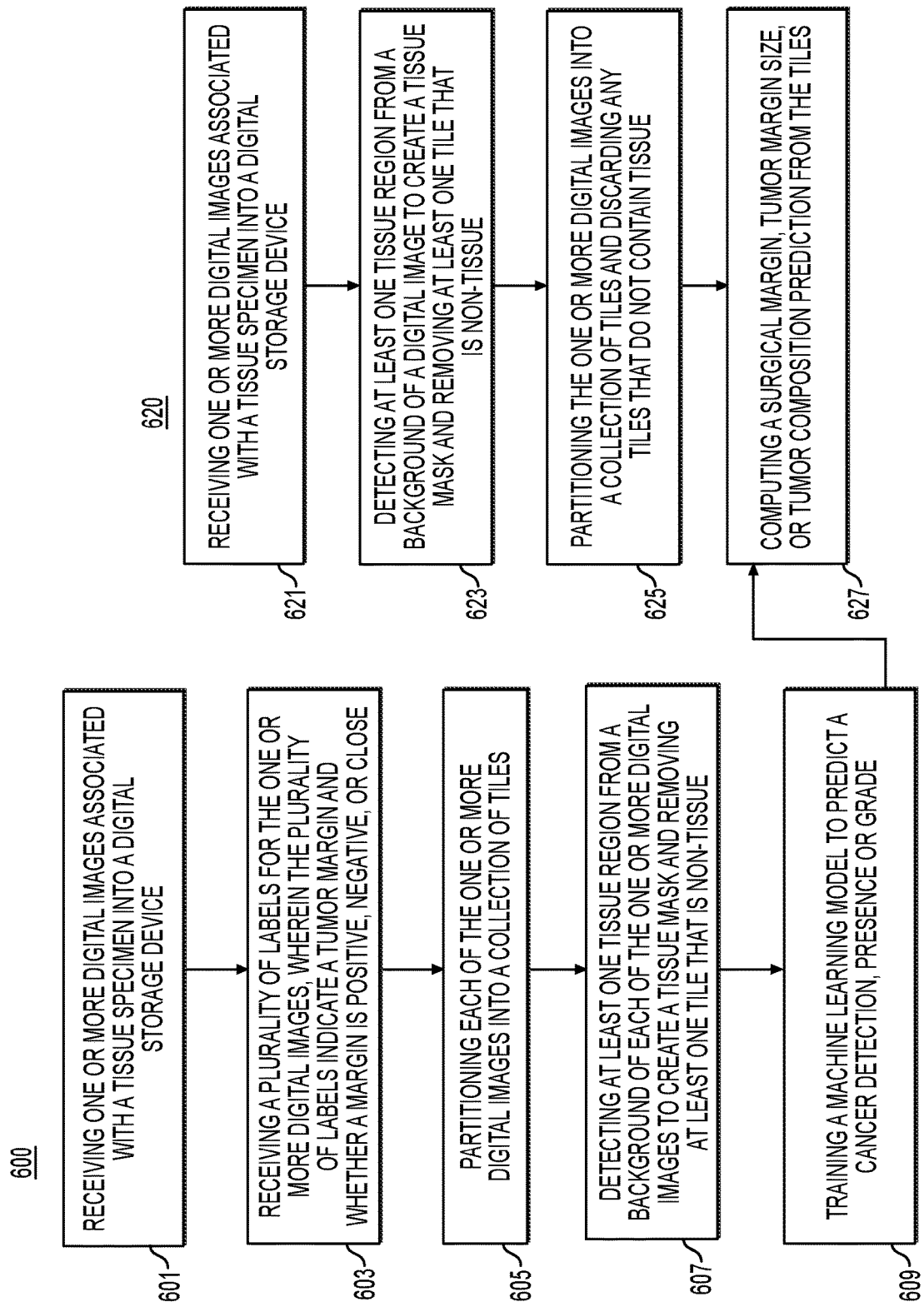
FIG. 6 is a flowchart illustrating an exemplary method for training and using a machine learning system for predicting a surgical margin, according to one or more exemplary embodiments of the present disclosure

FIG. 6 is a flowchart illustrating an exemplary method for training and using a machine learning system for predicting a surgical margin, according to one or more exemplary embodiments of the present disclosure. When a tumor is surgically removed from a patient, it may be important to assess if the tumor was completely removed by analyzing the margin of tissue surrounding the tumor. The width of this margin and the identification of any cancerous tissue in the margin may play an important role for determining how a patient may be treated. Training a model to predict margin width and composition may take the form of multi-label multi-task learning.

According to one embodiment, the exemplary methods 600 and 620 may include one or more of the following steps. In step 601, the method may include receiving one or more digital images associated with a tissue specimen into a digital storage device. The digital storage device may comprise a hard drive, a network drive, a cloud storage, a random access memory (RAM), etc.

In step 603, the method may include receiving a plurality of labels for the one or more digital images, wherein the plurality of labels indicate a tumor margin and whether a margin is positive (e.g., tumor cells are found in the margin), negative (e.g., the margin is entirely free of cancer) or close (e.g., not definitively positive or negative).

In step 605, the method may include partitioning each of the one or more digital images into a collection of tiles.

In step 607, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 609, the method may include training a machine learning model to predict a cancer detection, presence, or grade, as disclosed above.

In step 621, the method may include receiving one or more digital images associated with a tissue specimen into a digital storage device. The digital storage device may comprise a hard drive, a network drive, a cloud storage, a random access memory (RAM), etc.

In step 623, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 625, the method may include partitioning each of the one or more digital images into a collection of tiles.

In step 627, the method may include computing a surgical margin, tumor margin size, or tumor composition prediction from the tiles. The method may also include outputting the prediction to an electronic storage device.

Figure 7:
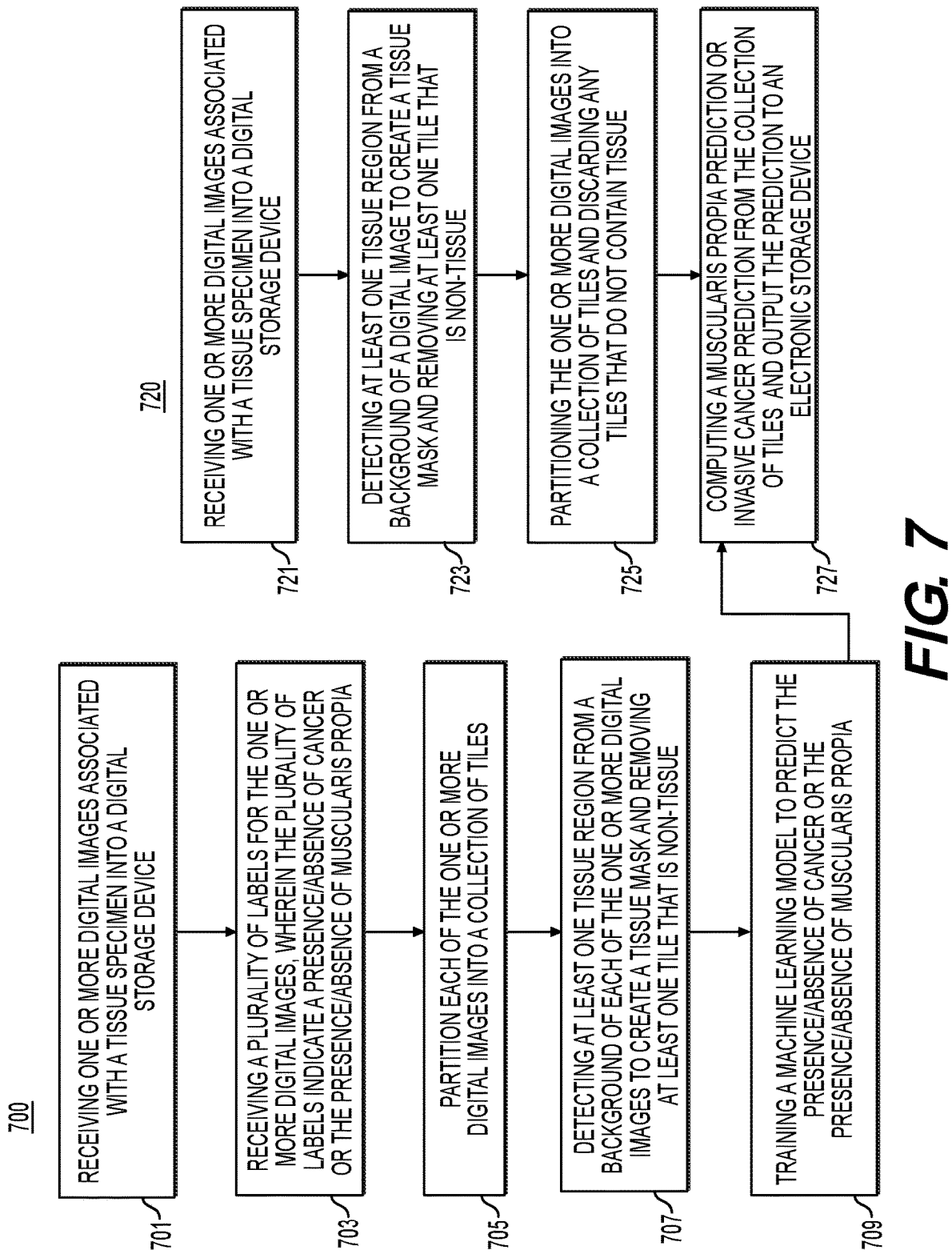
FIG. 7 is a flowchart illustrating an exemplary method for training and using a machine learning system for predicting a bladder cancer biomarker, according to one or more exemplary embodiments of the present disclosure.

FIG. 7 is a flowchart illustrating an exemplary method for training and using a machine learning system for predicting a bladder cancer biomarker, according to one or more exemplary embodiments of the present disclosure. Bladder cancer is one of the most common cancers in the world. If bladder cancer is detected, the pathologist may also determine if muscularis propria is present on any of the slides where bladder cancer is detected. Muscularis propria is a layer of smooth muscle cells forming a significant portion of the bladder wall. Detecting the presence or absence of the muscularis propria is an important step towards determining if bladder cancer is invasive or not. The embodiment performs both cancer detection and muscularis propria detection, but could be extended to any number of binary classification tasks.

According to one embodiment, the exemplary methods 700 and 720 may include one or more of the following steps. In step 701, receiving one or digital images associated with a tissue specimen into a digital storage device. The digital storage device may comprise a hard drive, a network drive, a cloud storage, a random access memory (RAM), etc.

In step 703, the method may include receiving a plurality of labels for the one or more digital images, wherein the plurality of labels indicate a presence or absence of cancer or the presence/absence of muscularis propria.

In step 705, the method may include partitioning each of the one or more digital images into a collection of tiles.

In step 707, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 709, the method may include training a machine learning model, e.g., by using a weakly supervised learning module (as disclosed above) to train a MIMLL model, and aggregating output scores indicating the presence/absence of cancer or the presence/absence of muscularis propria across multiple tiles. Alternatively, an aggregation model could be trained to predict multiple labels of each image, tile, or slide, using embeddings from each tile.

In step 721, the method may include receiving one or more digital images associated with a tissue specimen into a digital storage device. The digital storage device may comprise a hard drive, a network drive, a cloud storage, a random access memory (RAM), etc.

In step 723, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 725, the method may include partitioning each of the one or more digital images into a collection of tiles.

In step 727, the method may include computing a muscularis propria prediction or invasive cancer prediction from the collection of tiles. The method may also include outputting the prediction to an electronic storage device.

Figure 8:
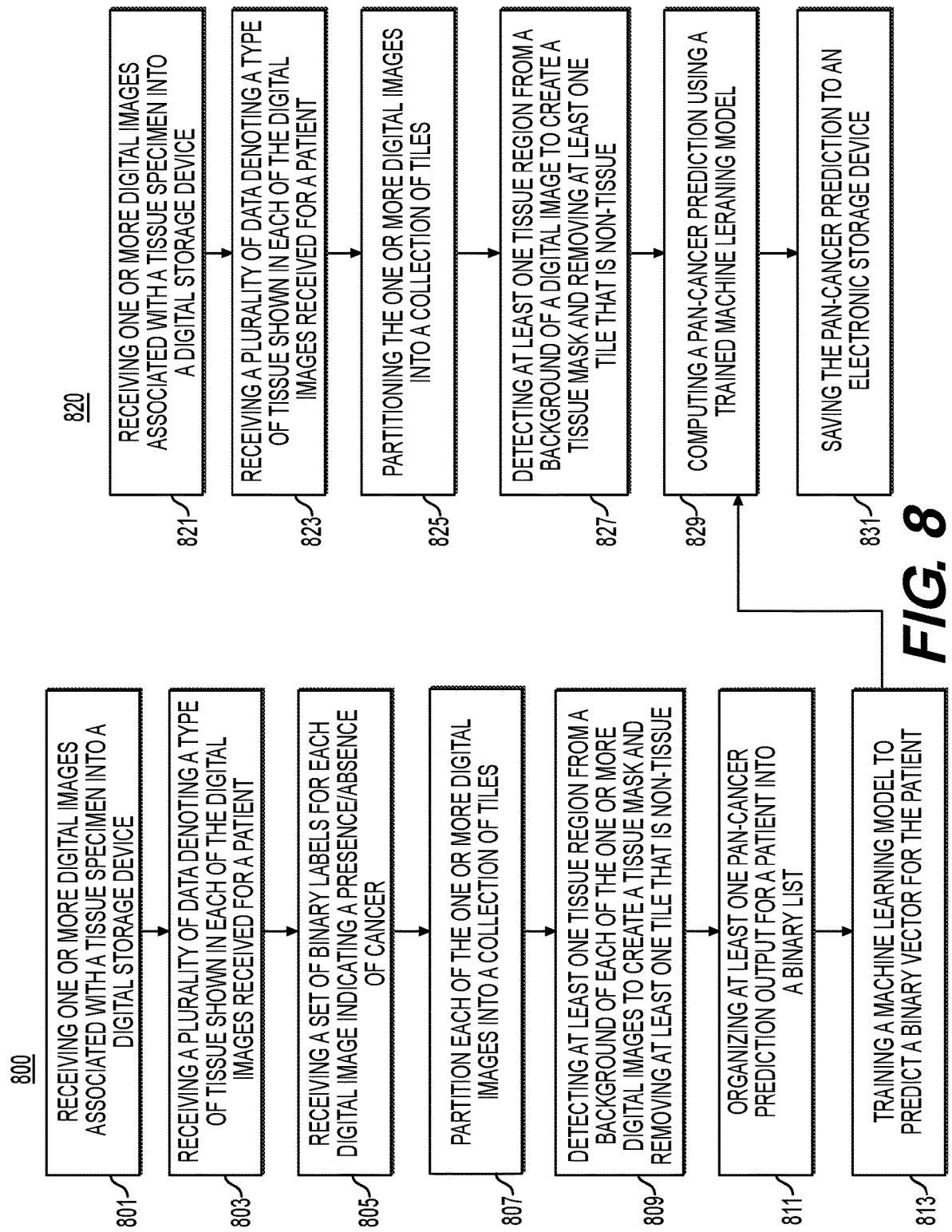
FIG. 8 is a flowchart illustrating an exemplary method for training and using a machine learning system for predicting a pan-cancer diagnosis, according to one or more exemplary embodiments of the present disclosure.

FIG. 8 is a flowchart illustrating an exemplary method for training and using a machine learning system for predicting a pan-cancer diagnosis, according to one or more exemplary embodiments of the present disclosure. While machine learning has been successfully used to create good models for predicting cancer in common cancer types, predictions for rare cancers are a challenge because there may be less training data. Another challenge is predicting where a cancer originated when it is metastatic, and sometimes the determination is not possible. Knowing the tissue of origin may help guide treatment of the cancer. The embodiment allows for pan-cancer prediction and cancer of origin prediction using a single machine learning model. By training on many tissue types, the method may achieve an understanding of tissue morphology such that it may effectively generalize rare cancer types where very little data may be available.

According to one embodiment, the exemplary methods 800 and 820 may include one or more of the following steps. In step 801, receiving one or digital images associated with a tissue specimen into a digital storage device. The digital storage device may comprise a hard drive, a network drive, a cloud storage, a random access memory (RAM), etc.

In step 803, the method may include receiving a plurality of data denoting a type of tissue shown in each of the digital images received for a patient.

In step 805, the method may include receiving a set of binary labels for each digital image indicating a presence or an absence of cancer.

In step 807, the method may include partitioning each of the one or more digital images into a collection of tiles.

In step 809, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 811, the method may include organizing at least one pan-cancer prediction output for a patient into a binary list. One element of the list may indicate the presence of any cancer, and other elements in the list may indicate the presence of each specific cancer type. For example, a prostate cancer specimen may have a positive indicator for general cancer, a positive indicator for prostate indicator for prostate cancer, and negative indicators for all other outputs corresponding to other tissues (e.g., lung, breast, etc.). A patient for which all slides are benign may have the label list contain all negative indicators.

In step 813, the method may include training a machine learning model to predict a binary vector for the patient. The machine learning model may comprise a MIMLL model as described above, wherein a weakly supervised learning module may train a MIMLL model. Additionally, the method may include aggregating pan-cancer prediction outputs of the MIMLL across various tiles, using an aggregation model (as disclosed above). Alternatively, an aggregation model may be trained to predict (multiple) pan-cancer prediction labels using embeddings from each tile.

In step 821, the method may include receiving one or more digital images associated with a tissue specimen into a digital storage device. The digital storage device may comprise a hard drive, a network drive, a cloud storage, a random access memory (RAM), etc.

In step 823, the method may include receiving a plurality of data denoting a type of tissue shown in each of the digital images received for a patient.

In step 825, the method may include partitioning each of the one or more digital images into a collection of tiles.

In step 827, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 829, the method may include computing a pan-cancer prediction using a trained machine learning model. The machine learning model may comprise the trained MIMLL model and/or aggregation model (as disclosed above). Exemplary outputs may include, but are not limited to the following:

a. Pan-cancer prediction: cancer presence output(s) may be used to determine the present of cancer regardless of tissue type, even for tissue types not observed during training. This may be helpful for rare cancers where there may not be enough data available to train a machine learning model.
  b. Cancer of origin prediction: cancer sub-type output(s) may be used to predict an origin of metastatic cancers by identifying the largest sub-type output. If one of the cancer outputs for a subtype is sufficiently higher than the type of tissue input to the system, then this may indicate to a pathologist that output is the cancer of origin. For example, if a bladder tissue specimen is found to have cancer by the machine learning model(s), but the prostate cancer sub-type output, this may indicate to a pathologist that the cancer found in the bladder may be metastasized prostate cancer instead of cancer that originated in the bladder.

In step 831, the method may include saving the prediction to an electronic storage device.

Figure 9:
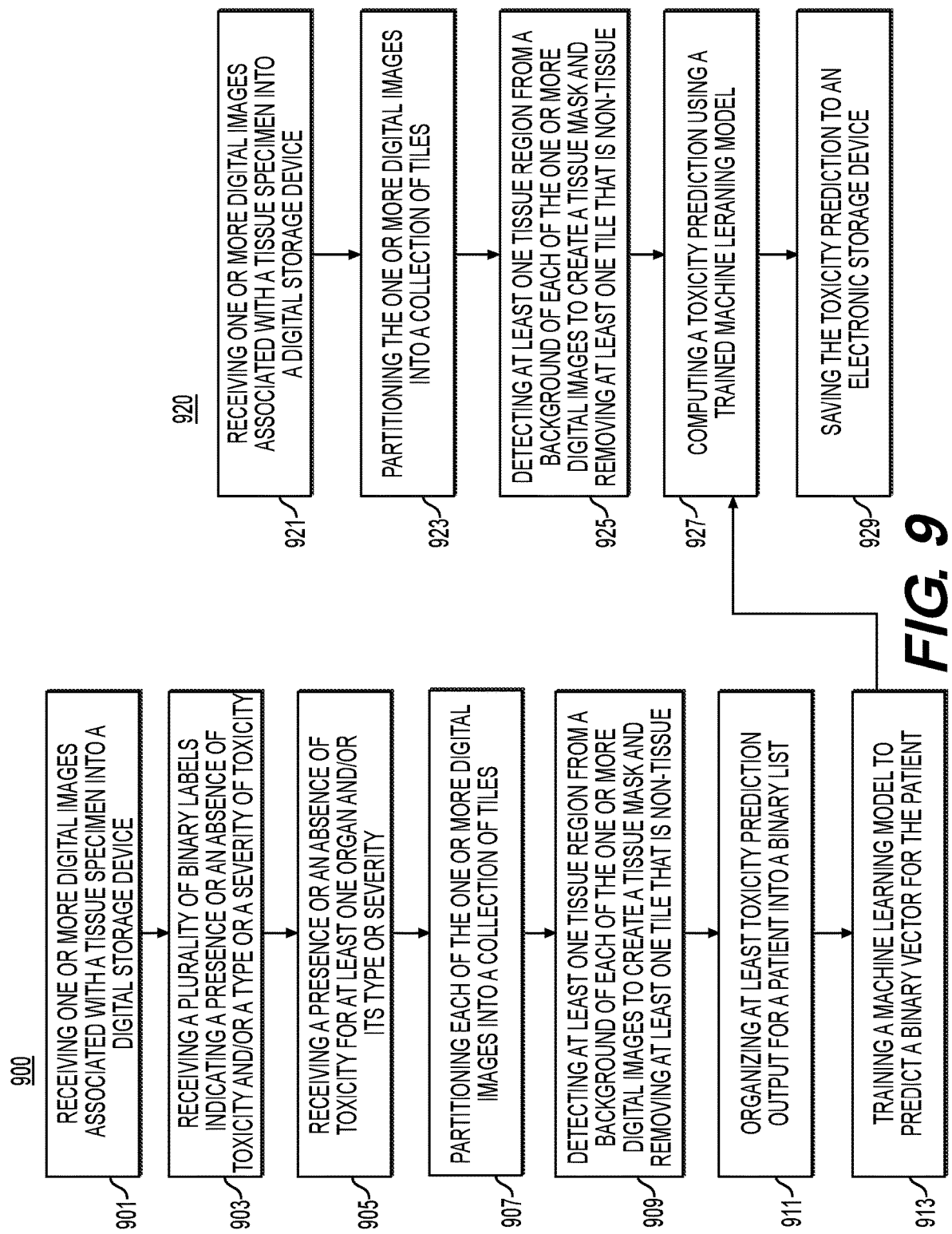
FIG. 9 is a flowchart illustrating an exemplary method for training and using a machine learning system for predicting an organ toxicity, according to one or more exemplary embodiments of the present disclosure.

FIG. 9 is a flowchart illustrating an exemplary method for training and using a machine learning system for predicting an organ toxicity, according to one or more exemplary embodiments of the present disclosure. In pre-clinical animal studies for drug development, pathologists determine if any toxicity is present, the form of toxicity, and/or the organs the toxicity may be found within. The embodiment enables performing these predictions automatically. A challenge with pre-clinical work is that a slide may contain multiple organs to save glass during preparation.

According to one embodiment, the exemplary methods 900 and 920 may include one or more of the following steps. In step 901, receiving one or digital images associated with a tissue specimen into a digital storage device. The digital storage device may comprise a hard drive, a network drive, a cloud storage, a random access memory (RAM), etc.

In step 903, the method may include receiving a plurality of binary labels indicating a present or an absence of toxicity and/or a type or severity of toxicity.

In step 905, the method may include receiving a presence or an absence of toxicity for at least one organ and/or its type or severity.

In step 907, the method may include partitioning each of the one or more digital images into a collection of tiles.

In step 909, the method may include detecting at least one tissue region from a background of each of the one or more digital images to create a tissue mask and removing at least one tile that is non-tissue. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 911, the method may include organizing at least one toxicity prediction output for a patient into a binary list. One element of the list may indicate the presence or type of any toxicity found on the slide, and other elements in the list may indicate the presence/type of toxicity in each organ.

In step 913, the method may include training a machine learning model to predict a binary vector for the patient. The machine learning model may comprise a MIMLL model as described above, wherein a weakly supervised learning module may train a MIMLL model. Additionally, the method may include aggregating toxicity prediction outputs of the MIMLL across various tiles, using an aggregation model (as disclosed above). Alternatively, an aggregation model may be trained to predict toxicity prediction labels using embeddings from each tile.

In step 921, the method may include receiving one or more digital images associated with a tissue specimen into a digital storage device. The digital storage device may comprise a hard drive, a network drive, a cloud storage, a random access memory (RAM), etc.

In step 923, the method may include partitioning each of the one or more digital images into a collection of tiles.

In step 925, the method may include detecting at least one tissue region from a background of each of the one or more digital images to create a tissue mask and removing at least one tile that is non-tissue. Further processing may commence without the non-tissue tiles. This may be achieved in a variety of ways, including but not limited to: thresholding methods, based on color, color intensity, texture features, Otsu's method, or any other suitable method, followed by running a connected components algorithm; and segmentation algorithms such as k-means, graph cuts, Mask R-CNN, or any other suitable method.

In step 927, the method may include computing a toxicity prediction using a trained machine learning model. The machine learning model may comprise the trained MIMLL model and/or aggregation model (as disclosed above). Exemplary outputs may include, but are not limited to the following:
  a. Toxicity presence: a toxicity presence output may be used to determine the presence and/or severity of toxicity, regardless of tissue type across the entire slide.
  b. Organ toxicity prediction: an organ toxicity output may be used to determine which organ the toxicity may be found within.

In step 929, the method may include saving the toxicity prediction to an electronic storage device.

Figure 10:
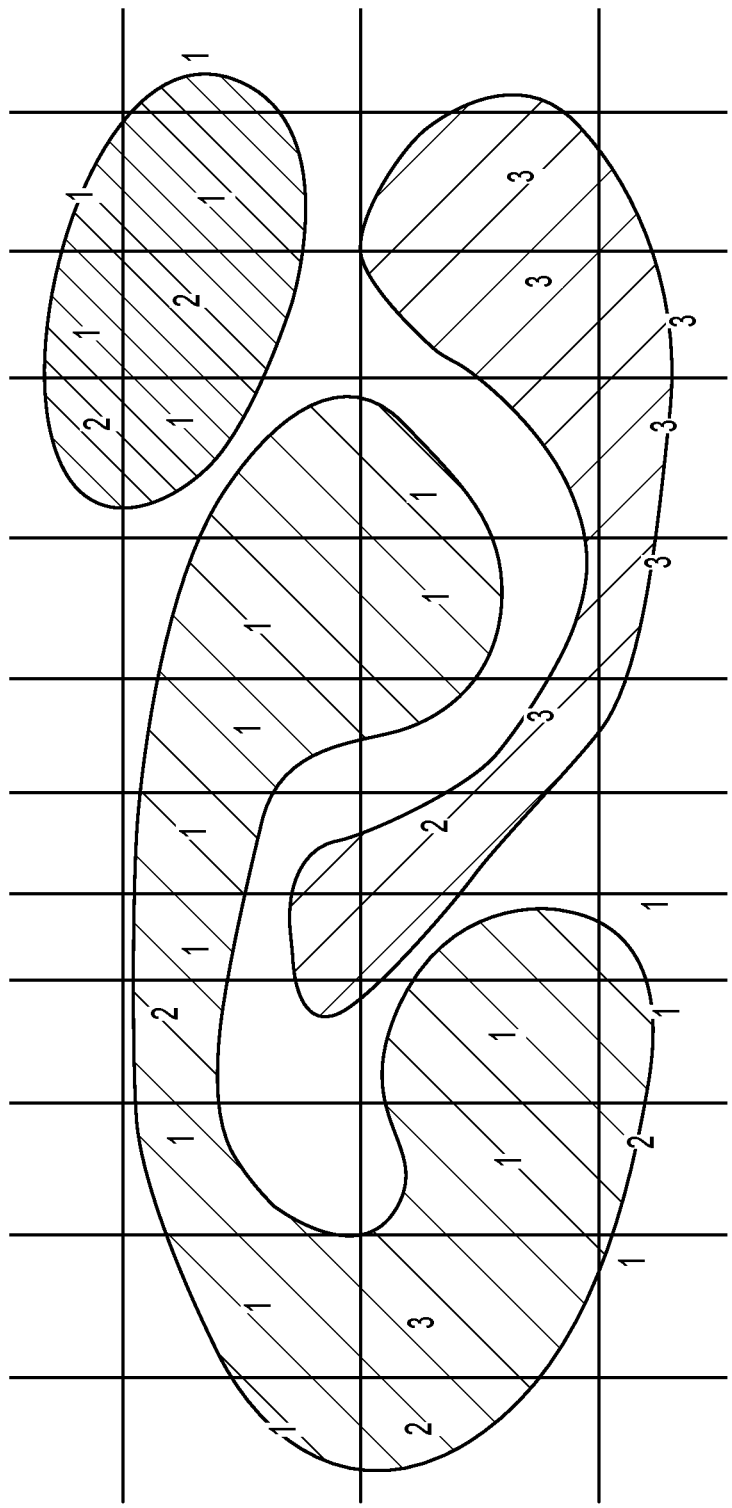
FIG. 10 illustrates an exemplary connected components algorithm, according to an embodiment of the disclosure.

FIG. 10 illustrates an exemplary connected components algorithm, according to an embodiment of the disclosure. The connected components algorithm may aggregate features across image regions. For example, thresholding may yield a binary (e.g., black and white) image. A connected components algorithm or model may identify various regions in the image, e.g., 3 regions (green, red, brown) at the pixel level. Each pixel may belong to a tile and a component (green, red, or brown) in the specific implementation using connected components. Aggregation may occur in many ways, including majority vote (e.g., for all tiles in the green component vote, resulting in green having a value of 1) or a learned aggregator (e.g., in which a vector of features may be extracted from each tile and input to a components aggregator module run for each component, so tiles in the green component would be fed into a components aggregator module which may produce a grade number). A CNN may output either a prediction (e.g., a number) for a tile, a feature vector for a tile that describes its visual properties, or both.

As shown in FIG. 11, device 1100 may include a central processing unit (CPU) 1120. CPU 1120 may be any type of processor device including, for example, any type of special purpose or a general-purpose microprocessor device. As will be appreciated by persons skilled in the relevant art, CPU 1120 also may be a single processor in a multi-core/multi-processor system, such system operating alone, or in a cluster of computing devices operating in a cluster or server farm. CPU 1120 may be connected to a data communication infrastructure 1110, for example a bus, message queue, network, or multi-core message-passing scheme.

Device 1100 may also include a main memory 1140, for example, random access memory (RAM), and also may include a secondary memory 1130. Secondary memory 1130, e.g. a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1130 may include similar means for allowing computer programs or other instructions to be loaded into device 1100. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 1100.

Device 1100 also may include a communications interface ("COM") 1160. Communications interface 1160 allows software and data to be transferred between device 1100 and external devices. Communications interface 1160 may include a modem, a network interface (such as an Ethernet card), a communications port, a PCMCIA slot and card, or the like. Software and data transferred via communications interface 1160 may be in the form of signals, which may be electronic, electromagnetic, optical or other signals capable of being received by communications interface 1160. These signals may be provided to communications interface 1160 via a communications path of device 1100, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 1100 may also include input and output ports 1150 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically can be grouped together to perform a function or group of related functions. Like reference numerals are generally intended to refer to the same or similar components. Components and modules may be implemented in software, hardware or a combination of software and hardware.

The tools, modules, and functions described above may be performed by one or more processors. "Storage" type media may include any or all of the tangible memory of the computers, processors, or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments of the invention will be apparent to those skilled in the art from consideration of the specification and practice of the invention disclosed herein. It is intended that the specification and examples to be considered as exemplary only.

What is claimed is:

1. A computer-implemented method for processing electronic slide images, the method comprising:
   receiving one or more electronic slide images associated with a tissue specimen, the tissue specimen being associated with a patient and/or medical case;
   generating a machine learning prediction model by:
   partitioning one of a plurality of training images into a plurality of training tiles for the plurality of training images;
   creating a training tissue mask by detecting at least one tissue region from a background of the one or more electronic slide images;
   removing at least one of the plurality of tiles detected to be non-tissue; and
   using the machine learning prediction model under weak supervision to infer at least one tile-level prediction using at least one label of a plurality of synoptic annotations of the plurality of training images.

2. The computer-implemented method of claim 1, wherein the plurality of tiles that are determined to be non-tissue are further determined to be a background of the tissue specimen.

3. The computer-implemented method of claim 1, further comprising: detecting a plurality of tissue regions of the one or more electronic slide images and/or plurality of tiles by segmenting the tissue regions from the background.

4. The computer-implemented method of claim 3, wherein the segmenting comprises using thresholding based on color, color intensity, and/or texture features.

5. The computer-implemented method of claim 1, wherein the plurality of training images comprise a plurality of electronic slide images and a plurality of target labels.

6. The computer-implemented method of claim 1, wherein using the machine learning prediction model under weak supervision comprises using at least one of multiple-instance learning (MIL), Multiple Instance Multiple Label Learning (MIMLL), self-supervised learning, and unsupervised clustering.

7. The computer-implemented method of claim 1, wherein using the machine learning prediction model under weak supervision comprises using at least one of Multiple Instance Multiple Label Learning (MIMLL), self-supervised learning, and unsupervised clustering.

8. The computer-implemented method of claim 1, further comprising:
   receiving a plurality of predictions of at least one feature from a weakly-supervised tile-level learning module for the plurality of training tiles;
   applying the machine learning model to take, as an input, the plurality of predictions of the at least one feature from the weakly-supervised tile-level learning module for the plurality of training tiles; and
   predicting a plurality of labels for a slide or a patient specimen, using the plurality of training tiles.

9. The computer-implemented method of claim 8, wherein at least one of the plurality of labels is binary, categorical, ordinal or real-valued.

10. The computer-implemented method of claim 8, wherein applying the machine learning model to take, as the input, the plurality of predictions of the at least one feature from the weakly-supervised tile-level learning module for the plurality of training tiles comprises a plurality of image features.

11. The computer-implemented method of claim 1, wherein the machine learning prediction model predicts at least one label using at least one unseen slide.

12. A system for processing electronic slide images corresponding to a tissue specimen, the system comprising:
at least one memory storing instructions; and
at least one processor configured to execute the instructions to perform operations comprising:
receiving one or more electronic slide images associated with the tissue specimen;
generating a machine learning prediction model by:
partitioning one of a plurality of training images into a plurality of training tiles for the plurality of training images;
creating a training tissue mask by detecting at least one tissue region from a background of the one or more electronic slide images;
removing at least one of the plurality of tiles detected to be non-tissue; and
using the machine learning prediction model under weak supervision to infer at least one tile-level prediction using at least one label of a plurality of synoptic annotations of the plurality of training images.

13. The system of claim 12, wherein the plurality of training tiles that are determined to be non-tissue are further determined to be a background of the tissue specimen.

14. The system of claim 12, further comprising: detecting a plurality of tissue regions of the one or more electronic slide images and/or plurality of tiles by segmenting the tissue regions from the background.

15. The system of claim 14, wherein the segmenting comprises using thresholding based on color, color intensity, and/or texture features.

16. The system of claim 12, wherein the plurality of training electronic slide images comprise a plurality of electronic slide images and a plurality of target labels.

17. The system of claim 12, wherein using the machine learning prediction model under weak supervision comprises using at least one of multiple-instance learning (MIL), Multiple Instance Multiple Label Learning (MIMLL), self-supervised learning, and unsupervised clustering.

18. The system of claim 12, further comprising:
receiving a plurality of predictions of at least one feature from a weakly-supervised tile-level learning module for the plurality of training tiles;
applying the machine learning model to take, as an input, the plurality of predictions of the at least one feature from the weakly-supervised tile-level learning module for the plurality of training tiles; and
predicting a plurality of labels for a slide or a patient specimen, using the plurality of training tiles.

19. The system of claim 18, wherein at least one of the plurality of labels is binary, categorical, ordinal or real-valued.

20. A non-transitory computer readable medium storing instructions that, when executed by a processor, cause the processor to perform a method for processing electronic slide images corresponding to a tissue specimen, the method comprising:
receiving one or more electronic slide images associated with a tissue specimen, the tissue specimen being associated with a patient and/or medical case;
generating a machine learning prediction model by:
partitioning one of a plurality of training images into a plurality of training tiles for the plurality of training images;
creating a training tissue mask by detecting at least one tissue region from a background of the one or more electronic slide images;
removing at least one of the plurality of tiles detected to be non-tissue; and
using the machine learning prediction model under weak supervision to infer at least one tile-level prediction using at least one label of a plurality of synoptic annotations of the plurality of training images.

* * * * *